United States Patent
Tanizawa

(10) Patent No.: US 10,291,400 B2
(45) Date of Patent: May 14, 2019

(54) QUANTUM KEY DISTRIBUTION DEVICE, QUANTUM KEY DISTRIBUTION SYSTEM, AND QUANTUM KEY DISTRIBUTION METHOD

(71) Applicant: Kabushiki Kaisha Toshiba, Minato-ku (JP)

(72) Inventor: Yoshimichi Tanizawa, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 263 days.

(21) Appl. No.: 15/267,972

(22) Filed: Sep. 16, 2016

(65) Prior Publication Data

US 2017/0264433 A1    Sep. 14, 2017

(30) Foreign Application Priority Data

Mar. 14, 2016 (JP) .................................. 2016-049754
Sep. 14, 2016 (JP) .................................. 2016-179604

(51) Int. Cl.
*H04L 29/06* (2006.01)
*H04L 9/08* (2006.01)

(52) U.S. Cl.
CPC .......... *H04L 9/0858* (2013.01); *H04L 63/061* (2013.01)

(58) Field of Classification Search
CPC ............................ H04L 9/0858; H04L 63/061
USPC .......................................................... 506/9
See application file for complete search history.

(56) References Cited

U.S. PATENT DOCUMENTS

| | | | |
|---|---|---|---|
| 7,646,873 | B2 | 1/2010 | Lee et al. |
| 2004/0184615 | A1 | 9/2004 | Elliott et al. |
| 2006/0062392 | A1 | 3/2006 | Lee et al. |
| 2007/0071244 | A1 | 3/2007 | LaGasse |
| 2008/0175385 | A1 | 7/2008 | Lee et al. |
| 2008/0222487 | A1* | 9/2008 | Matsumoto .......... H04L 1/0057 714/758 |
| 2009/0316910 | A1 | 12/2009 | Maeda et al. |
| 2011/0085666 | A1 | 4/2011 | Hicks |
| 2013/0251154 | A1 | 9/2013 | Tanizawa et al. |
| 2014/0181522 | A1 | 6/2014 | Tanizawa et al. |

(Continued)

FOREIGN PATENT DOCUMENTS

| | | |
|---|---|---|
| JP | 2014-53816 A | 3/2014 |
| JP | 5634427 B2 | 12/2014 |

*Primary Examiner* — Evans Desrosiers
(74) *Attorney, Agent, or Firm* — Oblon, McClelland, Maier & Neustadt, L.L.P.

(57) ABSTRACT

A communication device in embodiments is a quantum key distribution device connectable to another quantum key distribution device through a quantum communication channel to share an encryption key therebetween, and includes a common processing unit, one or more individual processing units, and a distribution unit. The common processing unit outputs intermediate data based on bit information obtained by transmitting or receiving sequence of photons with the another quantum key distribution device through the quantum communication channel. Each individual processing unit generates or provides the encryption key in accordance with the intermediate data. The distribution unit distributes the intermediate data that is output from the common processing unit to two or more distribution destination that include the individual processing units.

11 Claims, 11 Drawing Sheets

(56) References Cited

U.S. PATENT DOCUMENTS

2015/0214978 A1\* 7/2015 Yoon .................... G06N 99/002
714/776

\* cited by examiner

QUANTUM KEY DISTRIBUTION DEVICE, QUANTUM KEY DISTRIBUTION SYSTEM, AND QUANTUM KEY DISTRIBUTION METHOD

CROSS-REFERENCE TO RELATED APPLICATIONS

This application is based upon and claims the benefit of priority from Japanese Patent Application No. 2016-049754, filed on Mar. 14, 2016, and No. 2016-179604, filed on Sep. 14, 2016; the entire contents of which are incorporated herein by reference.

FIELD

Embodiments described herein relate generally to a quantum key distribution device, a quantum key distribution system, and a quantum key distribution method.

BACKGROUND

A quantum key distribution system includes a transmitting node, a receiving node, and an optical fiber link that connects the transmitting node and the receiving node. The transmitting node continuously transmits single photons to the receiving node through the optical fiber link (quantum communication channel), which is an optical fiber communication channel. After that, the transmitting node and the receiving node exchange control information to each other, thereby sharing an encryption key between the transmitting node and the receiving node with safety. This technology is achieved by a technology generally called "quantum key distribution (QKD)".

Quantum key distribution uses the uncertainty principle, which is one of the basic quantum-mechanical principles, that photons used to share an encryption key change their physical state when observed. Based on this principle, if an eavesdropper observes photons that contain encryption key information transmitted from the transmitting node on the quantum communication channel, the physical state of the photons is changed, and the receiving node that has received the photons can detect that the photons have been observed by the eavesdropper. Thus, by exchanging control information between the transmitting node and the receiving node on the basis of a sequence of photons obtained at the transmitting node and a sequence of photons detected at the receiving node, a safe encryption key is finally obtained.

Two nodes (for example, the above-mentioned transmitting node and receiving node) use the above-mentioned shared encryption key to encrypt and decrypt data, and perform encrypted data communication by using an encrypted communication scheme called "one-time pad". One-time pad is an encrypted communication scheme in which 1-byte data is encrypted with a 1-byte encryption key before transmitted, the data is decrypted with use of the same 1-byte encryption key at the time of reception, and the encryption key used once is discarded. In the encrypted data communication with one-time pad, it is guaranteed based on information theory that data cannot be deciphered by even an eavesdropper who has any knowledge. The technology for encrypted data communication using a safe encryption key shared by quantum key distribution as described above is called "quantum encryption technology". The quantum key distribution and the quantum encryption technology provide such an extremely high security function.

Achieving the quantum key distribution requires a technology for accurately controlling optical elements used to continuously transmit and receive single photons as described above, and the cost is increased. It is also necessary to lay an optical fiber that connects the transmitting node and the receiving node, and the cost is increased. In terms of cost, it is difficult to install and lay such costly devices and facilities individually for small-scale applications or a plurality of users of a quantum key distribution service or a quantum encryption service. As a technology dealing with the problem, it is proposed to employ an operation system that provides encryption keys for a plurality of applications by using a set of quantum key distribution devices.

The above-mentioned technology, however, simply allocates encryption keys generated and accumulated by a set of quantum key distribution devices to the applications. This technology cannot provide a plurality of different kinds of quantum key distributions at low cost, cannot provide different quantum key distributions or quantum encryption functions using different parameters and variations, such as an algorithm, about the quantum key distribution and the quantum encryption technology for each of the plurality of users, and cannot provide different quantum key distributions or quantum encryption functions according to requests of each of the plurality of users.

DETAILED DESCRIPTION

A communication device in embodiments is a quantum key distribution device connectable to another quantum key distribution device through a quantum communication channel to share an encryption key therebetween, and includes a common processing unit, one or more individual processing units, and a distribution unit. The common processing unit outputs intermediate data based on bit information obtained by transmitting or receiving sequence of photons with the another quantum key distribution device through the quantum communication channel. Each individual processing unit generates or provides the encryption key in accordance with the intermediate data. The distribution unit distributes the intermediate data that is output from the common processing unit to two or more distribution destination that include the individual processing units.

Referring to the accompanying drawings, a quantum key distribution device, a quantum key distribution system, and a quantum key distribution method according to embodiments of the present invention are now described in detail. Note that the drawings are schematic and specific configurations should be determined in consideration of the following description.

First Embodiment

Figure 1:
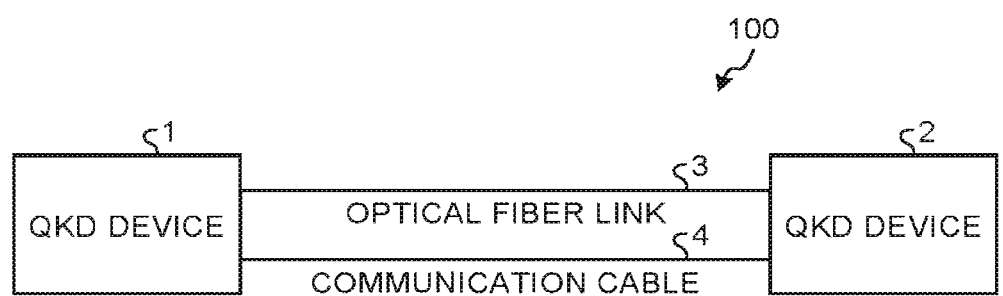
FIG. 1 is a diagram illustrating an exemplary overall configuration of a quantum key distribution system.

FIG. 1 is a diagram illustrating an exemplary overall configuration of a quantum key distribution system. Referring to FIG. 1, the configuration of a quantum key distribution system 100 is now described.

As illustrated in FIG. 1, the quantum key distribution system 100 includes a QKD device 1 (quantum key distribution device), a QKD device 2 (quantum key distribution device), an optical fiber link 3, and a communication cable 4.

The QKD device 1 is a transmitter configured to transmit a sequence of photons, which is generated from a laser and is made of single photons serving as a base to generate an encryption key, to the QKD device 2 through the optical fiber link 3. The QKD device 1 executes key distillation processing (sifting processing, error correction processing, and privacy amplification processing) to be described later on the basis of the transmitted sequence of photons, thereby generating an encryption key. In the key distillation processing, the QKD device 1 exchanges control information (not single photons but general digital data; hereinafter sometimes referred to as "key distillation processing data") with the QKD device 2 through the communication cable 4. The communication cable 4, which is a communication channel for data to be communicated among applications as described later (key use units 106a to 106c and 206a to 206c illustrated in FIG. 6 to be referred to later) as well as the key distillation processing data, is sometimes referred to as "classical communication channel". Note that the key distillation processing data may be transferred through the optical fiber link 3 between the QKD device 1 and the QKD device 2 rather than through the communication cable 4, or may be transferred with use of another communication channel (for example, a general Internet line).

The QKD device 2 is a receiver configured to receive the sequence of photons, which is made of single photons serving as a base to generate an encryption key, from the QKD device 1 through the optical fiber link 3. The QKD device 2 executes key distillation processing (sifting processing, error correction processing, and privacy amplification processing) to be described later on the basis of the received sequence of photons, thereby generating the same encryption key as the encryption key generated by the QKD device 1. In the key distillation processing, the QKD device 2 exchanges control information (key distillation processing data) with the QKD device 1 through the communication cable 4.

The optical fiber link 3 is an optical fiber cable that functions as a quantum communication channel serving as a transmission channel for single photons output from the QKD device 1. The communication cable 4 is a cable that functions as a classical communication channel used to communicate application communication data as described later as well as key distillation processing data between the QKD device 1 and the QKD device 2.

In the quantum key distribution system 100 including the QKD device 1 and the QKD device 2 as described above, if a sequence of photons transmitted from the QKD device 1 is observed by an eavesdropper on the optical fiber link 3, the physical state of the photons is changed, and the QKD device 2 that has received the photons can recognize that the photons have been observed by the eavesdropper.

For the above-mentioned photon transmission/reception processing and key distillation processing and key management (management of encryption keys) and key use (use of encryption keys) to be described later of the QKD devices 1 and 2, a plurality of parameters for setting items and the like or a plurality of variations for operations such as algorithm selection are prepared. Then, the parameters and the variations may be required to be appropriately selected depending on requests from the applications, a service-level agreement, or implementation of the applications. As used herein, a service-level agreement defines the quality of a service to be provided to a service user with some kind of conditions from the viewpoint of a provider who possesses physical QKD devices and provides a service of quantum key distribution or a service of quantum encryption function. Representative examples of the service-level agreement include requirements for availability and usage fees. In terms of a service of quantum key distribution or a service of quantum encryption function, the requirements may be key generation speed, an error rate of intermediate data for an encryption key to be provided, and a dispersion of the speed, error rate, basis bias, and laser intensity. Conditional requirements therefor may be a service-level agreement. From the viewpoint of a user of a service of quantum key distribution or a service of quantum encryption function in the first embodiment, who possesses no physical QKD device, various choices (combination of parameters or variations) are available on the use of a service. It is conceivable to select parameters or variations for the quantum key distribution and the quantum encryption function in terms of service operability, operating cost, and the like. Parameters and variations for the photon transmission/reception processing, the key distillation processing, the key management, and the key use, which are specific processing for the quantum key distribution and the quantum encryption function, are described later in detail.

Figure 2:
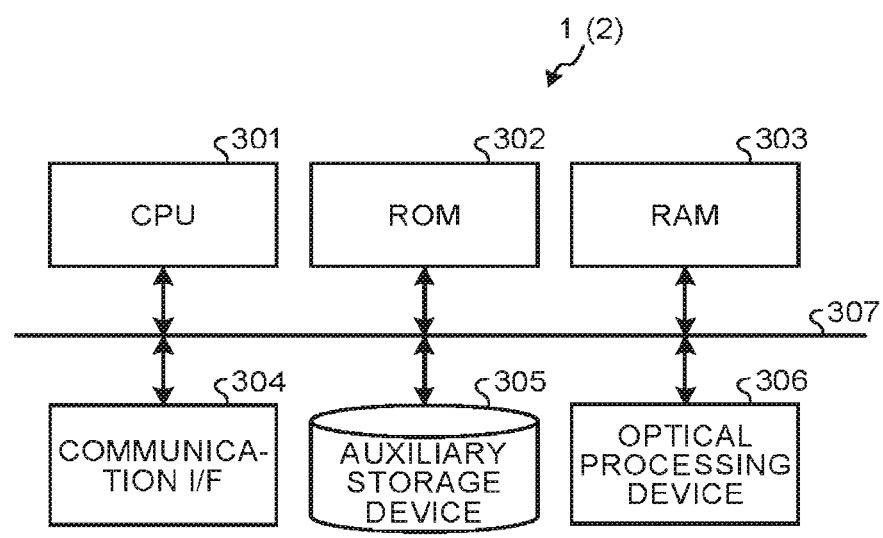
FIG. 2 is a diagram illustrating an exemplary hardware configuration of a QKD device.

FIG. 2 is a diagram illustrating an exemplary hardware configuration of the QKD device. Referring to FIG. 2, the hardware configuration of the QKD devices 1 and 2 is now described. Note that the following description takes the QKD device 1 as an example.

As illustrated in FIG. 2, the QKD device 1 includes a central processing unit (CPU) 301, a read only memory (ROM) 302, a random access memory (RAM) 303, a communication I/F 304, an auxiliary storage device 305, and an optical processing device 306.

The CPU 301 is an arithmetic device configured to control the overall operation of the QKD device 1. The ROM 302 is a non-volatile storage device configured to store therein computer programs such as a basic input/output system (BIOS) and firmware to be executed by the CPU 301 in order to control each function. The RAM 303 is a volatile storage device that functions as a work memory for the CPU 301.

The communication I/F 304 is an interface used for data communication through a classical communication channel (such as the communication cable 4). The communication I/F 304 may be an interface compatible with the Ethernet (trademark) such as 10Base-T, 100Base-TX, and 1000Base-T, or may be an optical fiber interface.

The auxiliary storage device 305 is a non-volatile storage device configured to store and accumulate therein various computer programs to be executed by the CPU 301 and intermediate data, encryption keys, and the like generated in the course of encryption key sharing operation (quantum key distribution). The auxiliary storage device 305 is a storage device capable of electrically, magnetically, or optically storing data therein, such as a hard disk drive (HDD), a solid state drive (SSD), or a flash memory or an optical disc.

The optical processing device 306 is an optical device configured to transmit or receive a sequence of photons through the quantum communication channel. The optical processing device 306 of the QKD device 1 transmits a sequence of photons made of single photons that are generated so as to have a polarized state that is based on basis information generated by a randomly-selected basis, for example, on the basis of a bit string (photon bit string) that is bit information generated by random numbers, for example, to the optical processing device 306 of the QKD device 2 through the quantum communication channel (optical fiber link 3 illustrated in FIG. 1). Specifically, each photon of the sequence of photons generated by the optical processing device 306 of the QKD device 1 has 1-bit information, "0" or "1". The optical processing device 306 of the QKD device 2 receives the sequence of photons from the optical processing device 306 of the QKD device 1 through the quantum communication channel, and reads the received sequence of photons on the basis of, for example, basis information generated by a randomly-selected basis, thereby obtaining a photon bit string that is bit information.

The above-mentioned CPU 301, ROM 302, RAM 303, communication I/F 304, auxiliary storage device 305, and optical processing device 306 are communicably connected to one another through a bus 307, such as an address bus and a data bus.

Figure 3:
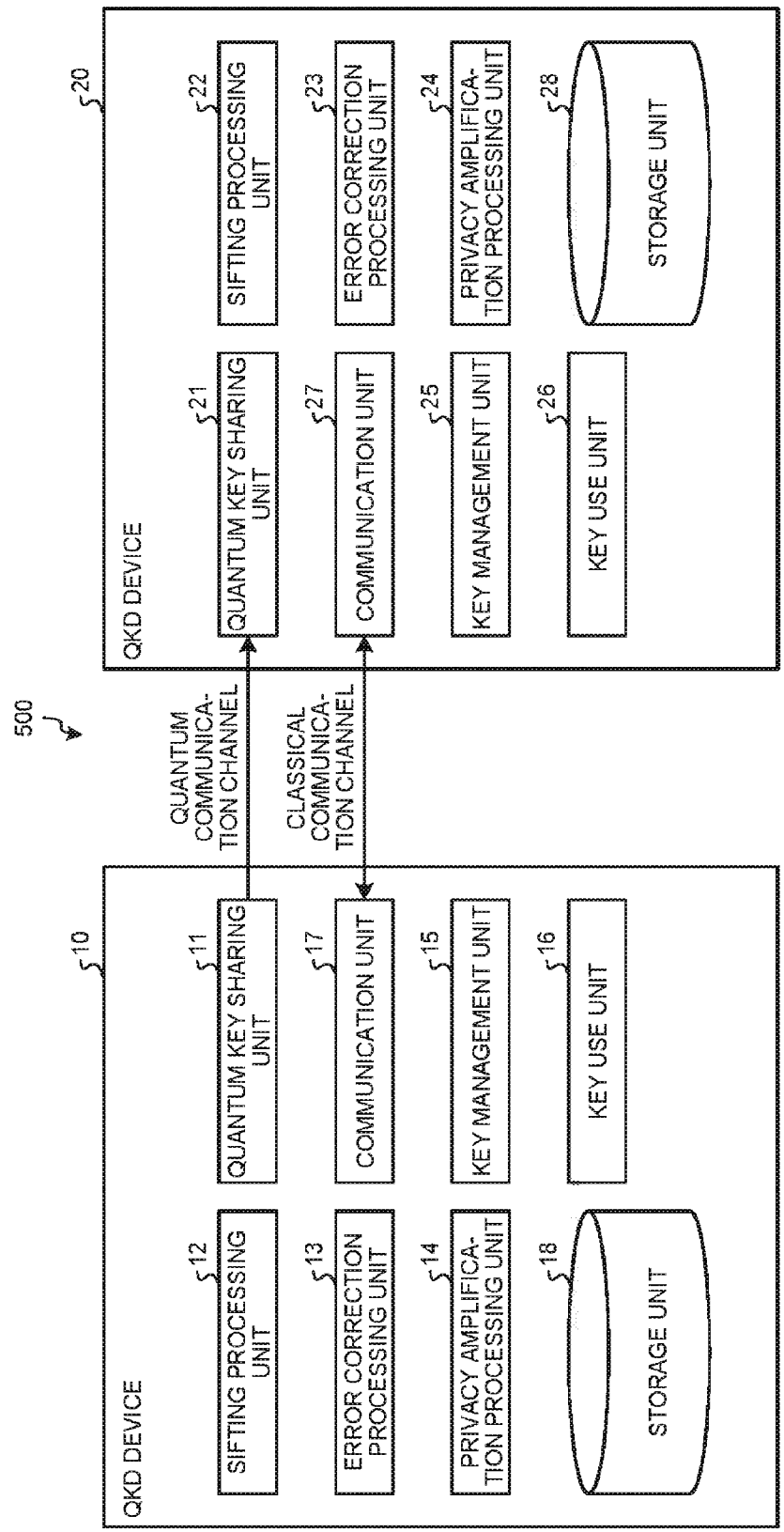
FIG. 3 is a diagram illustrating a functional block configuration of a general QKD device.

FIG. 3 is a diagram illustrating an exemplary configuration of functional blocks of a general QKD device. Referring to FIG. 3, the configuration of functional blocks of QKD devices (QKD devices 10 and 20) of a general quantum key distribution system (quantum key distribution system 500) is now described.

As illustrated in FIG. 3, the QKD device 10 includes a quantum key sharing unit 11, a sifting processing unit 12, an error correction processing unit 13, a privacy amplification processing unit 14, a key management unit 15, a key use unit 16, a communication unit 17, and a storage unit 18.

The quantum key sharing unit 11 is a functional unit configured to execute photon transmission processing for transmitting a sequence of photons made of single photons that are generated so as to have a polarized state that is based on basis information (transmitting basis) generated by a randomly-selected basis, for example, on the basis of a photon bit string that is bit information generated by random numbers, for example, to a quantum key sharing unit 21 of the QKD device 20 through a quantum communication channel. The quantum key sharing unit 11 stores the generated photon bit string and the transmitting basis (information containing the generated photon bit string and the generated transmitting basis is sometimes referred to as "transmitted photon information") in the storage unit 18. The quantum key sharing unit 11 transmits the generated transmitting basis and the generated photon bit string to the sifting processing unit 12. Note that, as described later, the quantum key sharing unit 11 may extract, on the basis of information representing the time at which the quantum key sharing unit 21 detects the photons, which is received from the quantum key sharing unit 21 through a classical communication channel, bit information corresponding to the detected photons from the photon bit string, and may use the extracted bit information as a new photon bit string.

An attenuated laser light source can be used as a generation source for single photons by the quantum key sharing unit 11. In this case, parameters in the photon transmission processing are the intensity, the attenuation rate, and a dispersion thereof of the laser light source. In the case where a laser light source is used as the generation source for single photons by the quantum key sharing unit 11, a plurality of photons rather than single photons are sometimes transmitted in a strict sense when photon bit string information is encoded to a sequence of photons on the basis of the transmitting basis. In order to eliminate this case and guarantee the safety of quantum key distribution, a method called "decoy scheme" is used. In the decoy scheme, the output intensity of the laser light source is not always constant, but photons are transmitted with a pulse whose intensity is different from the normal output intensity for transmitting bits with a certain constant probability. A decoy pulse and a vacuum pulse are available as the pulse to be transmitted with the intensity different from the normal output intensity. In this case, parameters in the photon transmission processing include the laser output intensity at the time of transmitting a decoy pulse or a vacuum pulse and the frequency (probability) of transmitting the pulse.

The selection of the transmitting basis by the quantum key sharing unit 11 and the selection of the receiving basis by the quantum key sharing unit 21 to be described later are basically made by a method of randomly selecting two kinds of bases at a rate of 50:50. A method called "efficient BB84", in which the rate is varied, is also known for more efficient quantum key distribution. In this case, parameters in the photon transmission processing include the rate of selecting which of the two kinds of bases.

The sifting processing unit 12 is a functional unit configured to execute sifting processing for receiving basis information (receiving basis) generated by the quantum key sharing unit 21 of the QKD device 20 from the QKD device 20 through the classical communication channel, comparing the received receiving basis with the transmitting basis stored in the storage unit 18, and extracting bits corresponding to coincident parts from the photon bit string to generate a shared bit string. The sifting processing unit 12 transmits the generated shared bit string to the error correction processing unit 13.

The shared bit string generated through the sifting processing contains noise on the optical fiber, noise due to photon detector characteristics of the quantum key sharing unit 21 of the QKD device 20, a trace of eavesdropping by an eavesdropper, and the like when photons are transmitted and received. Accordingly, the shared bit string generated by the sifting processing unit 12 and a shared bit string generated by a sifting processing unit 22 to be described later may differ in part of bits. The degree (probability) with which the shared bit strings are erroneous is referred to as "error rate". The error rate varies depending also on, for example, vibration of the optical fiber or temperature change. The sifting processing may involve calculating an estimated error rate to be used in error correction processing to be described later. For example, the estimated error rate is obtained by transmitting partial bit information of the shared bit string from the QKD device 20 to the QKD device 10 and comparing the bit information received from the QKD device 20 with bit information corresponding to the shared bit string generated by the QKD device 10, and is the rate representing the degree of an error that is estimated to be contained in the shared bit strings. Note that the partial bit information of the shared bit string may be transmitted from the QKD device 10 to the QKD device 20. In this case, a parameter in the sifting processing is the amount of bit information in the shared bit string used to calculate the estimated error rate.

The error correction processing unit 13 is a functional unit configured to execute error correction processing for exchanging error correction control information (error correction (EC) information) with an error correction processing unit 23 of the QKD device 20 through the classical communication channel, thereby correcting a bit error of the generated shared bit string to generate a corrected bit string. The error correction processing unit 13 transmits the generated corrected bit string to the privacy amplification processing unit 14. As a result, the corrected bit string generated by the error correction processing unit 13 and a corrected bit string generated through error correction processing by the error correction processing unit 23 to be described later become perfectly coincident bit strings.

The error correction processing has various algorithm variations such as Cascade and low density parity-check (LDPC). Each variation of the error correction processing has parameters such as the processing unit of an input shared bit string and an error correction code to be selected.

For example, in the case where LDPC is used as an algorithm of the error correction processing, the QKD device 10 and the QKD device 20 share an agreed error correction code in advance. The error correction processing unit 13 uses the error correction code to generate syndrome data from the corrected bit string as error correction control information, and transmits the error correction control information to the QKD device 20 through the classical communication channel. As described later, the error correction processing unit 23 of the QKD device 20 uses the error correction control information received from the QKD device 10 to generate a corrected bit string.

The error correction code has parameters: error correcting capability and efficiency. An error correction code with low error correcting capability can efficiently correct a shared bit string having a low error rate (efficiency is good), but cannot correct a shared bit string having a high error rate and fails to execute error correction processing. In this case, a shared bit string to be subjected to the error correction processing is discarded. On the other hand, an error correction code with high error correcting capability can correct even a shared bit string having a high error rate, but the size of syndrome data to be communicated is increased and the size of an encryption key finally obtained is reduced (efficiency is poor). In view of this fact, the error correction processing may employ a method involving referring to an estimated error rate for the shared bit string calculated through the above-mentioned sifting processing and selecting an error correction code in accordance with the estimated error rate. Note that the use of a large number of error correction codes in a switching manner has overhead, and even the accuracy of the estimated error rate itself is not always guaranteed. As described above, the operation of the error correction processing has variations, such as what characteristics the error correction code to be used has, the degree with which the error rate is corrected, what degree of probability of error correction is allowed to fail, what degree of efficiency is given importance, and what operation is performed when the error correction processing has failed.

Other variations in the error correction processing include what degree of processing speed is required (whether the processing is executed only by software or the processing is executed at high speed with dedicated hardware installed) and what communication scheme and format are employed between the QKD device 10 and the QKD device 20 (what communication protocol is used for communication, whether to encrypt communication itself, and what method is employed for data authentication).

The privacy amplification processing unit 14 is a functional unit configured to generate an encryption key by receiving control information (privacy amplification (PA) information) from a privacy amplification processing unit 24 of the QKD device 20 through the classical communication channel and subjecting, on the basis of the PA information, the generated corrected bit string to privacy amplification processing for cancelling out bits that may theoretically leak out and be eavesdropped by an eavesdropper in the executing the photon transmission processing, the sifting processing, and the error correction processing on the basis of the number of errors corrected through the error correction processing. The privacy amplification processing unit 14 stores and accumulates the generated encryption key in the storage unit 18.

For the privacy amplification processing, for example, the privacy amplification processing unit 14 first executes key length calculation for calculating what bits of encryption key the corrected bit string is compressed to on the basis of the known quantum cryptography theory. Then, the privacy amplification processing unit 14 executes key compression for generating an encryption key having the bit length determined through the key length calculation, thereby generating the encryption key.

The privacy amplification processing also has various algorithm variations based on the quantum cryptography theory. One example of the variations is an algorithm with hash operation using a universal hash function. In this case, the parameter of the hash function itself is the parameter in the privacy amplification processing. The parameter of the hash function itself may be set to the QKD device 10 and the QKD device 20 in advance, or may be transmitted from the QKD device 10 to the QKD device 20 or from the QKD device 20 to the QKD device 10 and updated. The privacy amplification processing using the hash function as described above has variations as to how to update the hash function, and the update period of the hash function is a parameter.

Other variations in the privacy amplification processing include what degree of processing speed is required (whether the processing is executed only by software or the processing is executed at high speed with dedicated hardware installed) and what communication scheme and format are employed between the QKD device 10 and the QKD device 20 (what communication protocol is used for communication, whether to encrypt communication itself, and what method is employed for data authentication).

The key management unit 15 is a functional unit configured to manage the encryption keys stored (accumulated) in the storage unit 18 (key management). The key management unit 15 provides the encryption key stored in the storage unit 18 to the key use unit 16, which is an application or the like configured to perform encrypted data communication.

The mode of key management has variations such as whether encryption keys are accumulated in units of a predetermined fixed length or in units of the original length generated through the privacy amplification processing, what kind of key ID is assigned for each encryption key accumulation unit, and how to manage the generation time of an encryption key. Implementation of the accumulation (storage) of encryption keys has variations such as whether an encryption key is in a binary format or in a text format and whether a file system or a database is used as the storage mode of encryption keys. Other variations include what size the storage capacity has and how to behave when an encryption key cannot be stored.

Possible variations on the premise that encryption keys are used with one-time pad include whether an encryption key for encrypted data communication from the QKD device 10 to the QKD device 20 and an encryption key for encrypted data communication from the QKD device 20 to the QKD device 10 are stored separately, and whether encryption keys are stored for each application in the case where a plurality of applications use encryption keys. Regarding the provision of encryption keys, various variations are conceivable as to what interface is used to provide an encryption key to an application. Examples of the variations include a method of providing a stream interface for providing an encryption key to an application, a method of preparing a language-specific application program interface (API), and a method of preparing a hypertext markup language (HTML) based API for transmitting an encryption key as a response. In this case, the variations include how to implement or not implement the provision of encryption keys to applications, how an application to be provided with an encryption key is authenticated, approved, charged, and log-managed, and how to implement related flow control if an encryption key cannot be generated in time.

The key use unit 16 is an application or the like configured to perform encrypted data communication by using the encryption key provided from the key management unit 15 (key use).

A method of using an encryption key by the key use unit 16 has variations as to encryption algorithms, such as whether an encryption key is used for one-time pad encryption or used for advanced encryption standard (AES) encryption. Other variations include whether to use a data authentication function and what kind of authentication algorithm is used. Variations for block encryption such as AES include what bits of key length are used and how frequently an encryption key is updated. These variations need to be selected depending on the strength of security or the function of security (such as whether authentication is necessary) required for an application.

Note that these key use functions may be implemented as a part of an application itself or implemented as a library for providing these functions. In the case where the key use functions are implemented as a library, a plurality of variations are conceivable about library interface design, such as what function is provided to a higher level computer program and what computer program language the functions are provided to.

The communication unit 17 is a functional unit configured to communicate data to and from the QKD device 20 through the classical communication channel.

The storage unit 18 is a functional unit configured to accumulate (store) therein encryption keys generated by the privacy amplification processing unit 14.

As illustrated in FIG. 3, the QKD device 20 includes the quantum key sharing unit 21, the sifting processing unit 22, the error correction processing unit 23, the privacy amplification processing unit 24, a key management unit 25, a key use unit 26, a communication unit 27, and a storage unit 28.

The quantum key sharing unit 21 is a functional unit configured to execute photon detection processing for detecting a sequence of photons from the quantum key sharing unit 11 of the QKD device 10 through the quantum communication channel and read the detected sequence of photons on the basis of basis information (receiving basis) generated by a randomly-selected basis, for example, thereby obtaining a photon bit string that is bit information. The quantum key sharing unit 21 stores the photon bit string and the receiving basis (information containing the photon bit string and the receiving basis is sometimes referred to as "detected photon information") in the storage unit 28. The quantum key sharing unit 21 transmits the generated reception information and the generated photon bit string to the sifting processing unit 22. Note that the quantum key sharing unit 21 may contain information representing the time at which the photons transmitted from the quantum key sharing unit 11 through the quantum communication channel are detected in the detected photon information. In this case, the quantum key sharing unit 21 may transmit the information representing the time to the quantum key sharing unit 11 through the classical communication channel. The above-mentioned photon transmission processing by the quantum key sharing unit 11 and the photon detection processing by the quantum key sharing unit 21 are hereinafter sometimes collectively referred to as "photon transmission/reception processing".

The sifting processing unit 22 is a functional unit configured to execute sifting processing for receiving the basis information (transmitting basis) generated by the quantum key sharing unit 11 of the QKD device 10 from the QKD device 10 through the classical communication channel, comparing the received transmitting basis with the receiving basis stored in the storage unit 28, and extracting bits corresponding to coincident parts from the photon bit string to generate a shared bit string. The sifting processing unit 22 transmits the generated shared bit string to the error correction processing unit 23.

The error correction processing unit 23 is a functional unit configured to execute error correction processing for exchanging error correction control information (EC information) with the error correction processing unit 13 of the QKD device 10 through the classical communication channel, thereby correcting a bit error of the generated shared bit string to generate a corrected bit string. The error correction processing unit 23 transmits the generated corrected bit string to the privacy amplification processing unit 24. As a result, the corrected bit string generated by the error correction processing unit 23 and the above-mentioned corrected bit string generated through the error correction processing by the error correction processing unit 13 become perfectly coincident bit strings.

For example, as described above, in the case where LDPC is used as an algorithm of the error correction processing, the error correction processing unit 23 uses an error correction code to generate a corrected bit string on the basis of the error correction control information received from the QKD device 10 through the classical communication channel and the shared bit string.

The privacy amplification processing unit 24 is a functional unit configured to generate an encryption key by generating and transmitting control information (PA information) to the privacy amplification processing unit 14 of the QKD device 10 through the classical communication channel and subjecting, on the basis of the PA information, the generated corrected bit string to privacy amplification processing for cancelling out bits that may theoretically leak out and be eavesdropped by an eavesdropper in the photon transmission processing, the sifting processing, and the error correction processing on the basis of the number of errors corrected through the error correction processing. The privacy amplification processing unit 24 stores and accumulates the generated encryption key in the storage unit 28. Specific processing contents of the privacy amplification processing are the same as those of the above-mentioned privacy amplification processing unit 14.

The key management unit 25 is a functional unit configured to manage the encryption keys stored (accumulated) in the storage unit 28 (key management). The key management unit 25 provides the encryption key stored in the storage unit 28 to the key use unit 26, which is an application or the like configured to perform encrypted data communication.

The key use unit 26 is an application or the like configured to perform encrypted data communication by using the encryption key provided from the key management unit 25 (key use).

The communication unit 27 is a functional unit configured to communicate data to and from the QKD device 10 through the classical communication channel.

The storage unit 28 is a functional unit configured to accumulate (store) therein the encryption keys generated by the privacy amplification processing unit 24.

Parameters and variations for the functions and operations of the quantum key sharing unit 21, the sifting processing unit 22, the error correction processing unit 23, the privacy amplification processing unit 24, the key management unit 25, and the key use unit 26 are as described above for the QKD device 10.

Figure 4:
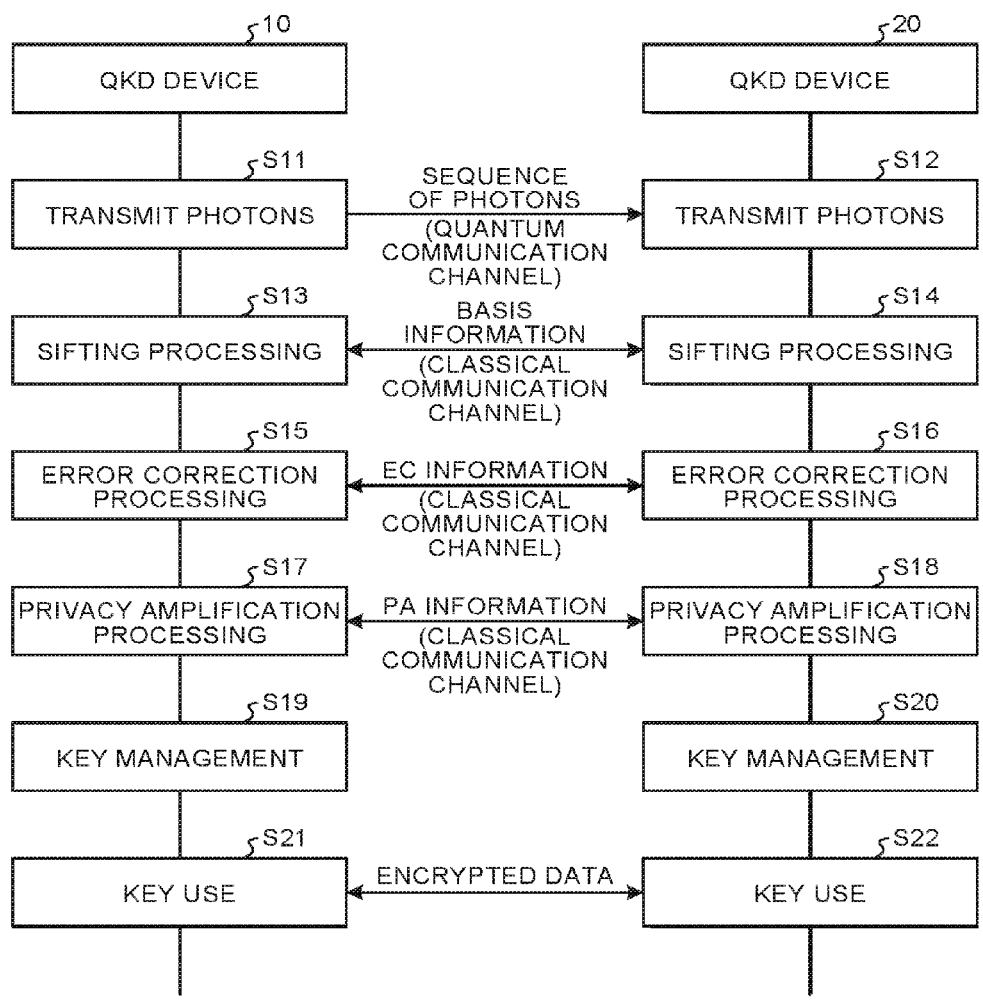
FIG. 4 is a sequence diagram illustrating a general encryption key sharing operation.

FIG. 4 is a sequence diagram illustrating an exemplary encryption key sharing operation of a general quantum key distribution system. Referring to FIG. 4, the flow of operation of the quantum encryption function including a general encryption key sharing operation (quantum key distribution) is now comprehensively described.

<Step S11>

The quantum key sharing unit 11 executes photon transmission processing for transmitting a sequence of photons made of single photons that are generated so as to have a polarized state that is based on basis information (transmitting basis) generated by a randomly-selected basis, for example, on the basis of a photon bit string that is bit information generated by random numbers, for example, to the quantum key sharing unit 21 of the QKD device 20 through the quantum communication channel. The quantum key sharing unit 11 transmits the generated photon bit string and the generated transmitting basis (transmitted photon information) in the storage unit 18. The quantum key sharing unit 11 transmits the generated transmitting basis and the generated photon bit string to the sifting processing unit 12.

<Step S12>

The quantum key sharing unit 21 executes photon detection processing for detecting a sequence of photons from the quantum key sharing unit 11 of the QKD device 10 through the quantum communication channel and reads the detected sequence of photons on the basis of basis information (receiving basis) generated by a randomly-selected basis, for example, thereby obtaining a photon bit string that is bit information. The quantum key sharing unit 21 stores the photon bit string and the receiving basis (detected photon information) in the storage unit 28. The quantum key sharing unit 21 transmits the generated reception information and the generated photon bit string to the sifting processing unit 22.

<Step S13>

The sifting processing unit 12 executes sifting processing for receiving the basis information (receiving basis) generated by the quantum key sharing unit 21 of the QKD device 20 from the QKD device 20 through the classical communication channel, comparing the received receiving basis with the transmitting basis stored in the storage unit 18, and extracting bits corresponding to coincident parts from the photon bit string to generate a shared bit string. The sifting processing unit 12 transmits the generated shared bit string to the error correction processing unit 13.

<Step S14>

The sifting processing unit 22 executes sifting processing for receiving the basis information (transmitting basis) generated by the quantum key sharing unit 11 of the QKD device 10 from the QKD device 10 through the classical communication channel, comparing the received transmitting basis with the receiving basis stored in the storage unit 28, and extracting bits corresponding to coincident parts from the photon bit string to generate a shared bit string. The sifting processing unit 22 transmits the generated shared bit string to the error correction processing unit 23.

<Step S15>

The error correction processing unit 13 executes error correction processing for exchanging error correction control information (EC information) with the error correction processing unit 23 of the QKD device 20 through the classical communication channel, thereby correcting a bit error of the generated shared bit string to generate a corrected bit string. The error correction processing unit 13 transmits the generated corrected bit string to the privacy amplification processing unit 14.

<Step S16>

The error correction processing unit 23 executes error correction processing for exchanging error correction control information (EC information) with the error correction processing unit 13 of the QKD device 10 through the classical communication channel, thereby correcting a bit error of the generated shared bit string to generate a corrected bit string. The error correction processing unit 23 transmits the generated corrected bit string to the privacy amplification processing unit 24. As a result, the corrected bit string generated by the error correction processing unit 23 and the above-mentioned corrected bit string generated through the error correction processing by the error correction processing unit 13 become perfectly coincident bit strings.

<Step S17>

The privacy amplification processing unit 14 generates an encryption key by receiving control information (PA information) from the privacy amplification processing unit 24 of the QKD device 20 through the classical communication channel and subjecting, on the basis of the PA information, the generated corrected bit string to privacy amplification processing for cancelling out bits that may theoretically leak out and be eavesdropped by an eavesdropper in the photon transmission processing, the sifting processing, and the error correction processing on the basis of the number of errors corrected through the error correction processing.

The privacy amplification processing unit 14 stores and accumulated the generated encryption key in the storage unit 18.

<Step S18>

The privacy amplification processing unit 24 generates an encryption key by generating and transmitting control information (PA information) to the privacy amplification processing unit 14 of the QKD device 10 through the classical communication channel and subjecting, on the basis of the PA information, the generated corrected bit string to privacy amplification processing for cancelling out bits that may theoretically leak out and be eavesdropped by an eavesdropper in the photon transmission processing, the sifting processing, and the error correction processing on the basis of the number of errors corrected through the error correction processing. The privacy amplification processing unit 24 stores and accumulates the generated encryption key in the storage unit 28.

<Step S19>

The key management unit 15 manages the encryption keys stored (accumulated) in the storage unit 18 (key management). The key management unit 15 provides the encryption key stored in the storage unit 18 to the key use unit 16, which is an application or the like configured to perform encrypted data communication.

<Step S20>

The key management unit 25 manages the encryption keys stored (accumulated) in the storage unit 28. The key management unit 25 provides the encryption key stored in the storage unit 28 to the key use unit 26, which is an application or the like configured to perform encrypted data communication.

<Step S21>

The key use unit 16 uses the encryption key provided from the key management unit 15 (key use) to perform encrypted data communication.

<Step S22>

The key use unit 26 uses the encryption key provided from the key management unit 25 (key use) to perform encrypted data communication.

Through the operation as described above, coincident encryption keys are generated in the QKD device 10 and the QKD device 20. By repeatedly executing the above-mentioned operation, coincident encryption keys can be continuously generated.

Figure 5:
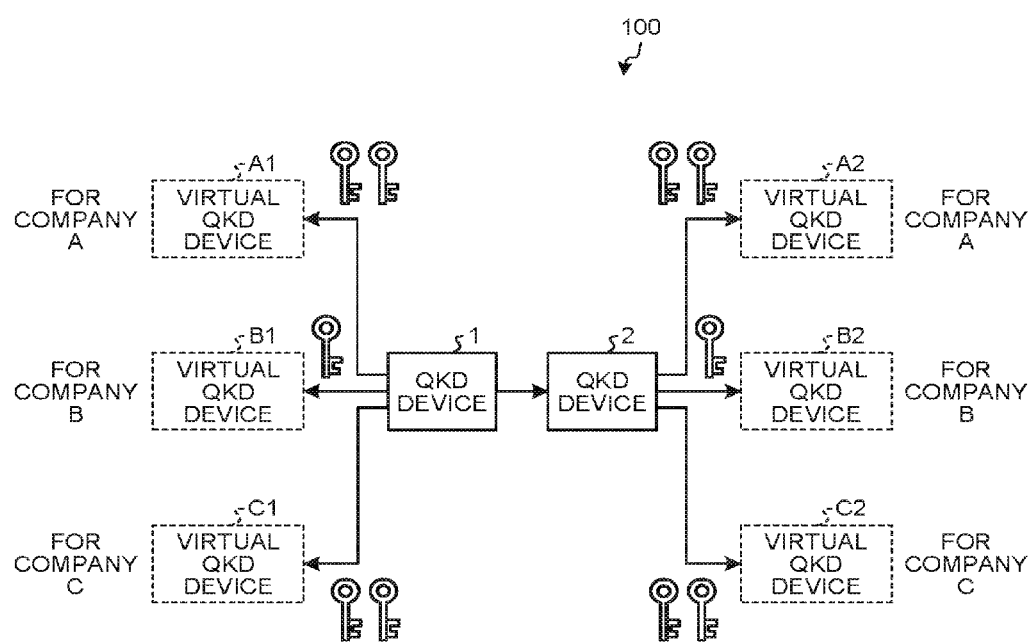
FIG. 5 is a diagram for conceptually describing a configuration of a virtual QKD device.

FIG. 5 is a diagram conceptually illustrating the configuration of virtual QKD devices. Referring to FIG. 5, the virtualization of the quantum key distribution and the quantum encryption function is described.

As illustrated in FIG. 5, there are a pair of QKD devices that connect two bases (respective bases at which the QKD device 1 and the QKD device 2 are located). A quantum key distribution system 100 including the pair of QKD devices includes the QKD device 1 (physical QKD device) located at one base, the QKD device 2 (physical QKD device) located at the other base, the optical fiber link 3 (see FIG. 1) that connects the two physical QKD devices as a quantum communication channel, and the communication cable 4 (see FIG. 1) that connects the two physical QKD devices as a classical communication channel. There are only one pair of physical QKD devices (QKD devices 1 and 2), but in the example illustrated in FIG. 5, three different companies (companies A to C) seem to virtually have a pair of dedicated QKD devices. In other words, one pair of QKD devices are virtualized so that respective companies virtually exclusively own three pairs of QKD devices (virtual QKD devices). Specifically, as illustrated in FIG. 5, the company A exclusively owns a virtual QKD device A1 obtained by virtualizing the QKD device 1 and a virtual QKD device A2 obtained by virtualizing the QKD device 2. The company B exclusively owns a virtual QKD device B1 obtained by virtualizing the QKD device 1 and a virtual QKD device B2 obtained by virtualizing the QKD device 2. The company C exclusively owns a virtual QKD device C1 obtained by virtualizing the QKD device 1 and a virtual QKD device C2 obtained by virtualizing the QKD device 2.

Each company operates QKD devices (virtual QKD devices) that are virtually owned thereby, in accordance with a corresponding request, policy, or service-level agreement agreed with a provider of QKD devices (hereinafter sometimes collectively referred to as "request contents"). Then, virtual QKD devices on each company apparently execute the quantum key distribution and the quantum encryption function in accordance with parameters and variations that differ depending on request contents.

Note that, in the example illustrated in FIG. 5, the virtualized QKD devices are set for three companies, the companies A to C. However, the number of companies is not limited thereto, and the QKD devices may be virtualized for another number of companies. For a simple description, a case where the QKD devices 1 and 2 are virtualized for three companies, the companies A to C, is described below.

Figure 6:
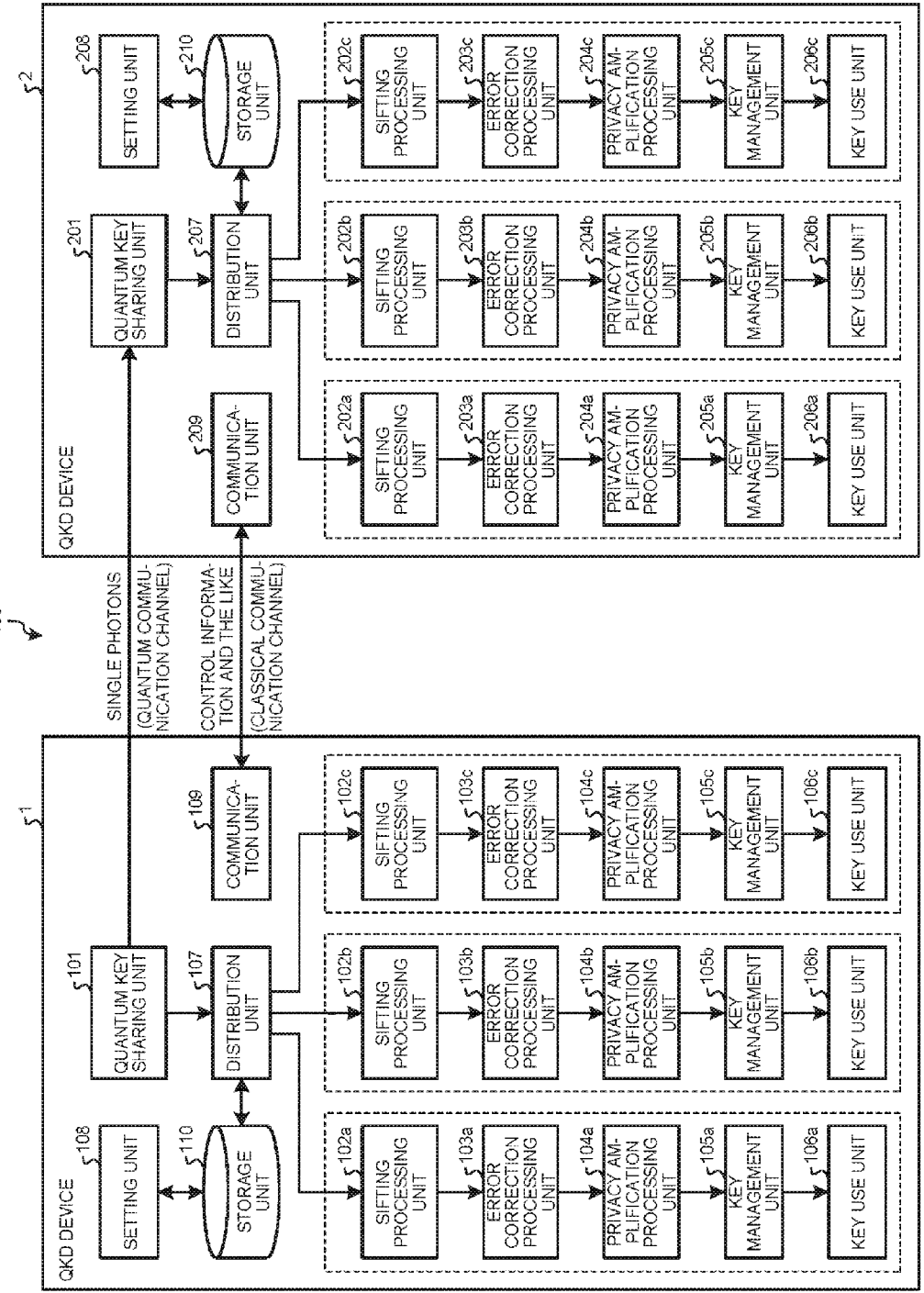
FIG. 6 is a diagram illustrating a functional block configuration of a QKD device according to a first embodiment.

FIG. 6 is a diagram illustrating an exemplary configuration of functional blocks of QKD devices according to the first embodiment. Referring to FIG. 6, the configuration of the functional blocks of the QKD devices (QKD devices 1 and 2) according to the first embodiment is now described. Note that a difference from the functional block configuration and encryption key sharing operation of the general QKD device described above with reference to FIG. 3 and FIG. 4 is mainly described.

As illustrated in FIG. 6, the QKD devices 1 and 2 execute the photon transmission/reception processing among the processing in the operation of the quantum encryption function including the quantum key distribution as the physical QKD devices as normal. However, the QKD devices 1 and 2 independently execute the key distillation processing (sifting processing, error correction processing, and privacy amplification processing), the key management, and the key use in accordance with different parameters and different variations as virtual QKD devices A1 and A2, virtual QKD devices B1 and B2, and virtual QKD devices C1 and C2, which are virtualized for the companies A to C, respectively. Parameters and variations for the sifting processing, the error correction processing, the privacy amplification processing, the key management, and the key use are as described above with reference to FIG. 3. These parameters and variations are selected on the basis of respective request contents from operators of the virtual QKD devices A1 and A2, the virtual QKD devices B1 and B2, and the virtual QKD devices C1 and C2.

As illustrated in FIG. 6, the QKD device 1 includes a quantum key sharing unit 101, sifting processing units 102a to 102c, error correction processing units 103a to 103c, privacy amplification processing units 104a to 104c, key management units 105a to 105c, key use units 106a to 106c, a distribution unit 107, a setting unit 108, a communication unit 109, and a storage unit 110.

The quantum key sharing unit 101, the communication unit 109, and the storage unit 110 are functional units having the same functions as the quantum key sharing unit 11, the communication unit 17, and the storage unit 18 described above with reference to FIG. 3, respectively. The quantum key sharing unit 101 is implemented by the optical processing device 306 illustrated in FIG. 2. The communication unit 109 is implemented by the communication I/F 304 illustrated in FIG. 2. The storage unit 110 is implemented by the auxiliary storage device 305 illustrated in FIG. 2.

The sifting processing units 102a to 102c are each a functional unit having the same function as the sifting processing unit 12 described above with reference to FIG. 3 as the basic sifting processing. The sifting processing units 102a to 102c respectively operate in accordance with parameters and variations for sifting processing that are set by the setting unit 108 on the basis of request contents from the companies A to C.

The error correction processing units 103a to 103c are each a functional unit having the same function as the error correction processing unit 13 described above with reference to FIG. 3 as the basic error correction processing. The error correction processing units 103a to 103c respectively operate in accordance with parameters and variations for error correction processing that are set by the setting unit 108 on the basis of request contents from the companies A to C.

The privacy amplification processing units 104a to 104c are each a functional unit having the same function as the privacy amplification processing unit 14 described above with reference to FIG. 3 as the basic privacy amplification processing. The privacy amplification processing units 104a to 104c respectively operate in accordance with parameters and variations for privacy amplification processing that are set by the setting unit 108 on the basis of request contents from the companies A to C.

The key management units 105a to 105c are each a functional unit having the same key management function as the key management unit 15 described above with reference to FIG. 3. The key management units 105a to 105c respectively operate in accordance with parameters and variations for key management that are set by the setting unit 108 on the basis of request contents from the companies A to C.

The key use units 106a to 106c are each a functional unit having the same key use function as the key use unit 16 described above with reference to FIG. 3. The key use units 106a to 106c respectively operate in accordance with parameters and variations for key use that are set by the setting unit 108 on the basis of request contents from the companies A to C.

The setting unit 108 is a functional unit configured to set parameters and variations for sifting processing, error correction processing, privacy amplification processing, key management, and key use in accordance with respective request contents from the companies A to C.

The distribution unit 107 is a functional unit configured to distribute transmitted photon information (transmitting basis and photon bit string), which is intermediate data generated through the photon transmission/reception processing by the quantum key sharing unit 101 and a quantum key sharing unit 201, to the sifting processing units 102a to 102c. The distribution unit 107 determines the respective distribution amounts of the transmitted photon information to be distributed to the sifting processing units 102a to 102c in accordance with respective request contents from the companies A to C.

For example, the simplest distribution method for the transmitted photon information is a method of equally distributing the transmitted photon information to the sifting processing units 102a to 102c. The distribution unit 107 may distribute the transmitted photon information with a varied proportion in accordance with respective key generation speeds (speed of generating an encryption key by the privacy amplification processing unit 14) requested from the companies A to C. For example, when the request for the key generation speed from the company A is twice the key generation speeds requested from the companies B and C, the distribution unit 107 may distribute the transmitted photon information with a distribution ratio of "company A:company B:company C=2:1:1. In this case, the priorities associated with the companies A to C may be taken into consideration.

Examples of the criteria for determining the distribution amount of the transmitted photon information to the sifting processing units 102a to 102c by the distribution unit 107 include the bias of the basis, the proportion of decoy pulses and vacuum pulses, a dispersion of decoy pulses and vacuum pulses, and a dispersion of laser intensity. The bias of the basis required from a company may differ depending on a virtual QKD device. The proportion of decoy pulses and vacuum pulses required from a company may differ depending on a virtual QKD device. The tolerance for the dispersion of decoy pulses and vacuum pulses may differ depending on a virtual QKD device exclusively owned by a company. The tolerance for the dispersion of laser intensity may differ depending on a virtual QKD device exclusively owned by a company.

The above-mentioned sifting processing units 102a to 102c, error correction processing units 103a to 103c, privacy amplification processing units 104a to 104c, key management units 105a to 105c, key use units 106a to 106c, distribution unit 107, and setting unit 108 are implemented by the CPU 301 illustrated in FIG. 2 reading a computer program stored in the auxiliary storage device 305 or other storage devices to the RAM 303 and executing the read computer program. Note that the first embodiment is not limited to the configuration in which all of the sifting processing units 102a to 102c, the error correction processing units 103a to 103c, the privacy amplification processing units 104a to 104c, the key management units 105a to 105c, the key use units 106a to 106c, the distribution unit 107, and the setting unit 108 are implemented by the execution of a computer program, and at least one of these units may be implemented by a hardware circuit such as an application specific integrated circuit (ASIC), a field-programmable gate array (FPGA), and other integrated circuits.

Note that FIG. 6 conceptually illustrates the functions of the quantum key sharing unit 101, the sifting processing units 102a to 102c, the error correction processing units 103a to 103c, the privacy amplification processing units 104a to 104c, the key management units 105a to 105c, the key use units 106a to 106c, the distribution unit 107, the setting unit 108, the communication unit 109, and the storage unit 110, and embodiments are not limited to these configurations. For example, in the QKD device 1 illustrated in FIG. 6, a plurality of functional units illustrated as independent functional units may be configured as a single functional unit. Alternatively, in the QKD device 1 illustrated in FIG. 6, the function of a single functional unit may be divided into a plurality of functions to be configured as a plurality of functional units.

As illustrated in FIG. 6, the QKD device 2 includes a quantum key sharing unit 201, sifting processing units 202a to 202c, error correction processing units 203a to 203c, privacy amplification processing units 204a to 204c, key management units 205a to 205c, key use units 206a to 206c, a distribution unit 207, a setting unit 208, a communication unit 209, and a storage unit 210.

The quantum key sharing unit 201, the communication unit 209, and the storage unit 210 are functional units having the same functions as the quantum key sharing unit 21, the communication unit 27, and the storage unit 28 described above with reference to FIG. 3, respectively. The quantum key sharing unit 201 is implemented by the optical processing device 306 illustrated in FIG. 2. The communication unit 209 is implemented by the communication I/F 304 illustrated in FIG. 2. The storage unit 210 is implemented by the auxiliary storage device 305 illustrated in FIG. 2.

The sifting processing units 202a to 202c are each a functional unit having the same function as the sifting processing unit 22 described above with reference to FIG. 3 as the basic sifting processing. The sifting processing units 202a to 202c respectively operate in accordance with parameters and variations for sifting processing that are set by the setting unit 208 on the basis of request contents from the companies A to C.

The error correction processing units 203a to 203c are each a functional unit having the same function as the error correction processing unit 23 described above with reference to FIG. 3 as the basic error correction processing. The error correction processing units 203a to 203c respectively operate in accordance with parameters and variations for error correction processing that are set by the setting unit 208 on the basis of request contents from the companies A to C.

The privacy amplification processing units 204a to 204c are each a functional unit having the same function as the privacy amplification processing unit 24 described above with reference to FIG. 3 as the basic privacy amplification processing. The privacy amplification processing units 204a to 204c respectively operate in accordance with parameters and variations for privacy amplification processing that are set by the setting unit 208 on the basis of request contents from the companies A to C.

The key management units 205a to 205c are each a functional unit having the same key management function as the key management unit 25 described above with reference to FIG. 3. The key management units 205a to 205c respectively operate in accordance with parameters and variations for key management that are set by the setting unit 208 on the basis of request contents from the companies A to C.

The key use units 206a to 206c are each a functional unit having the same key use function as the key use unit 26 described above with reference to FIG. 3. The key use units 206a to 206c respectively operate in accordance with parameters and variations for key use that are set by the setting unit 208 on the basis of request contents from the companies A to C.

The setting unit 208 is a functional unit configured to set parameters and variations for sifting processing, error correction processing, privacy amplification processing, key management, and key use in accordance with respective request contents from the companies A to C.

The distribution unit 207 is a functional unit configured to distribute detected photon information (receiving basis and photon bit string), which is intermediate data generated through the photon transmission/reception processing by the quantum key sharing unit 201 and the quantum key sharing unit 101, to the sifting processing units 202a to 202c. The distribution unit 207 determines the respective distribution amounts of the detected photon information to be distributed to the sifting processing units 202a to 202c in accordance with respective request contents from the companies A to C. A specific distribution method for the detected photon information by the distribution unit 207 is the same as the above-mentioned distribution method for the transmitted photon information by the distribution unit 107.

The above-mentioned sifting processing units 202a to 202c, error correction processing units 203a to 203c, privacy amplification processing units 204a to 204c, key management units 205a to 205c, key use units 206a to 206c, distribution unit 207, and setting unit 208 are implemented by the CPU 301 illustrated in FIG. 2 reading a computer program stored in the auxiliary storage device 305 or other storage devices to the RAM 303 and executing the read computer program. Note that the first embodiment is not limited to the configuration in which all of the sifting processing units 202a to 202c, the error correction processing units 203a to 203c, the privacy amplification processing units 204a to 204c, the key management units 205a to 205c, the key use units 206a to 206c, the distribution unit 207, and the setting unit 208 are implemented by the execution of computer programs, and at least one of these units may be implemented by a hardware circuit such as an ASIC, a FPGA, and other integrated circuits.

Note that FIG. 6 conceptually illustrates the functions of the quantum key sharing unit 201, the sifting processing units 202a to 202c, the error correction processing units 203a to 203c, the privacy amplification processing units 204a to 204c, the key management units 205a to 205c, the key use units 206a to 206c, the distribution unit 207, the setting unit 208, the communication unit 209, and the storage unit 210, and embodiments are not limited to these configurations. For example, in the QKD device 2 illustrated in FIG. 6, a plurality of functional units illustrated as independent functional units may be configured as a single functional unit. Alternatively, in the QKD device 2 illustrated in FIG. 6, the function of a single functional unit may be divided into a plurality of functions to be configured as a plurality of functional units.

Laser intensities of optimum data pulses, decoy pulses, and vacuum pulses may differ from one virtual QKD device to another. In this case, through the setting of the quantum key sharing unit 101 (201), which is not virtualized, the setting can be made such that data pulses, decoy pulses, and vacuum pulses with different intensities are sent to virtual QKD devices (in accordance with respective request contents from the companies A to C) in principle.

In the first embodiment, the "common processing unit" of the present invention corresponds to the quantum key sharing unit 101 in the QKD device 1, and the "individual processing units" correspond to the respective the sifting processing units 102a to 102c and the subsequent processing units. The same applies to the QKD device 2. Furthermore, in the first embodiment, the "key distillation processing unit" of the present invention corresponds to a series of the respective sifting processing units 102a to 102c, error correction processing units 103a to 103c, and privacy amplification processing units 104a to 104c in the QKD device 1. The same applies to the QKD device 2.

As described above, in the first embodiment, a pair of physical QKD devices are virtualized so that a plurality of pairs of QKD devices (virtual QKD devices) seem to exist and a plurality of users or use organizations (in the example in the above-mentioned embodiment, companies) exclusively own the virtual QKD devices. Then, the virtual QKD devices exclusively owned by users or use organizations are respectively operated on the basis of different parameters and different variations for each of a plurality of users or use organizations. Particularly in the first embodiment, the virtual QKD devices are operated on the basis of different parameters and different variations for the sifting processing and subsequent processing among the processing of the quantum key distribution and the quantum encryption function. In this manner, the quantum key distribution and the quantum encryption function about the sifting processing and subsequent processing suited for respective request contents from a plurality of users and use organizations can be provided. Specifically, a pair of physical QKD devices can provide a plurality of actually different kinds of quantum key distribution and quantum encryption function. With this configuration, in the case of using the quantum key distribution or the quantum encryption function based on different parameters and different variations, the use cost for the quantum key distribution or the quantum encryption function can be remarkably reduced as compared with the conventional technology in which dedicated physical QKD devices need to be installed and laid for respective users and use organizations. In addition, from the viewpoint of a developer and a provider of QKD devices, one pair of QKD devices can conventionally provide only one kind of quantum key distribution or quantum encryption function, but the use of the quantum key distribution system 100 according to the first embodiment enables one pair of QKD devices to provide a plurality of different kinds of quantum key distribution or quantum encryption function, thereby enlarging users and use organizations for the quantum key distribution or the quantum encryption function.

The distribution amount of the intermediate data (transmitted photon information or detected photon information) generated through the photon transmission/reception processing by the quantum key sharing unit 101 or 201 can be determined in accordance with request contents from users and use organizations. In this manner, the encryption key can be generated and provided on the basis of generation speed suited for request contents from users and use organizations.

Figure 7:
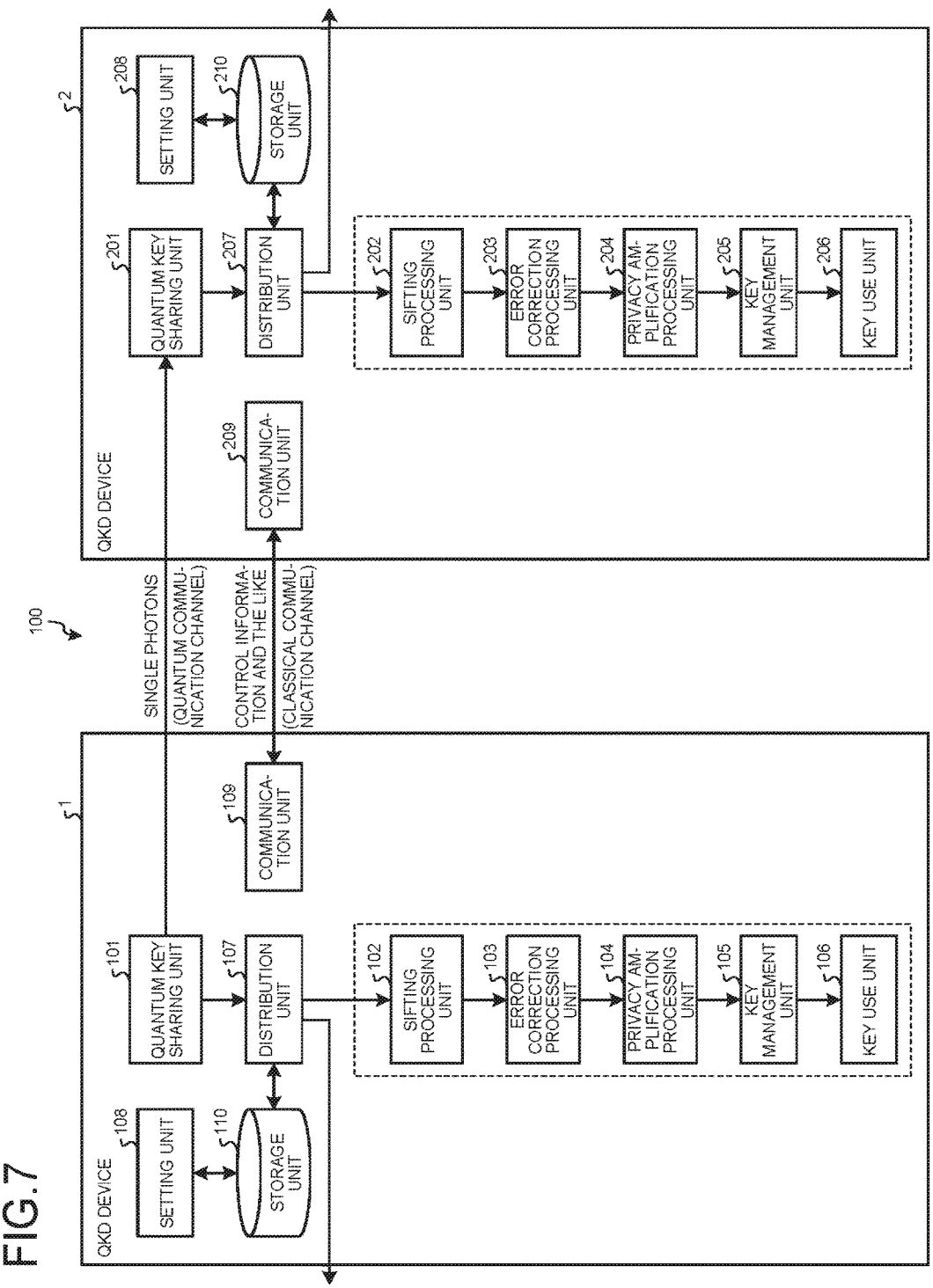
FIG. 7 is a diagram illustrating a functional block configuration of a QKD device according to a first embodiment.

Note that, because a pair of QKD devices is virtualized to be three pairs of QKD devices, FIG. 6 illustrates that the distribution units 107 and 207 distribute the intermediate data to three distribution destinations. The number of distribution destinations, however, is not limited to three. The number of distribution destinations can be, for example, two or four or more. Moreover, it is not necessary that the distribution destinations are the "individual processing units", i.e., the sifting processing units executed in the same QKD device. In other words, it is allowable that there is an "individual processing unit" executed on another device and the distribution unit distributes the intermediate data (transmitted photon information or detected photon information) to the "individual processing unit". In this case, a QKD device includes one or more individual processing units, and the distribution unit distributes the intermediate data to two or more distribution destinations that include the one or more individual processing units executed by the QKD device. FIG. 7 illustrates a configuration in which the distribution unit distributes the intermediate data to two individual processing units in total: one individual processing unit inside the QKD device and another individual processing unit outside the QKD device. The same configuration is applicable to the following second to sixth embodiments.

Second Embodiment

A quantum key distribution system according to a second embodiment is now described, mainly focusing on a difference from the quantum key distribution system 100 according to the first embodiment. In the first embodiment, a description has been given of the configuration in which the operation of the sifting processing and subsequent processing among the processing of the quantum key distribution and the quantum encryption function is executed in accordance with parameters and variations that differ from one company to another. In the second embodiment, a description is given of the configuration in which the operation of the error correction processing and subsequent processing among the processing of the quantum key distribution and the quantum encryption function is executed in accordance with parameters and variations that differ from one company to another. Note that the overall configuration of the quantum key distribution system, the hardware configuration of the QKD devices, and the virtualization mode of the quantum key distribution and the quantum encryption function according to the second embodiment are the same as those in the first embodiment.

Figure 8:
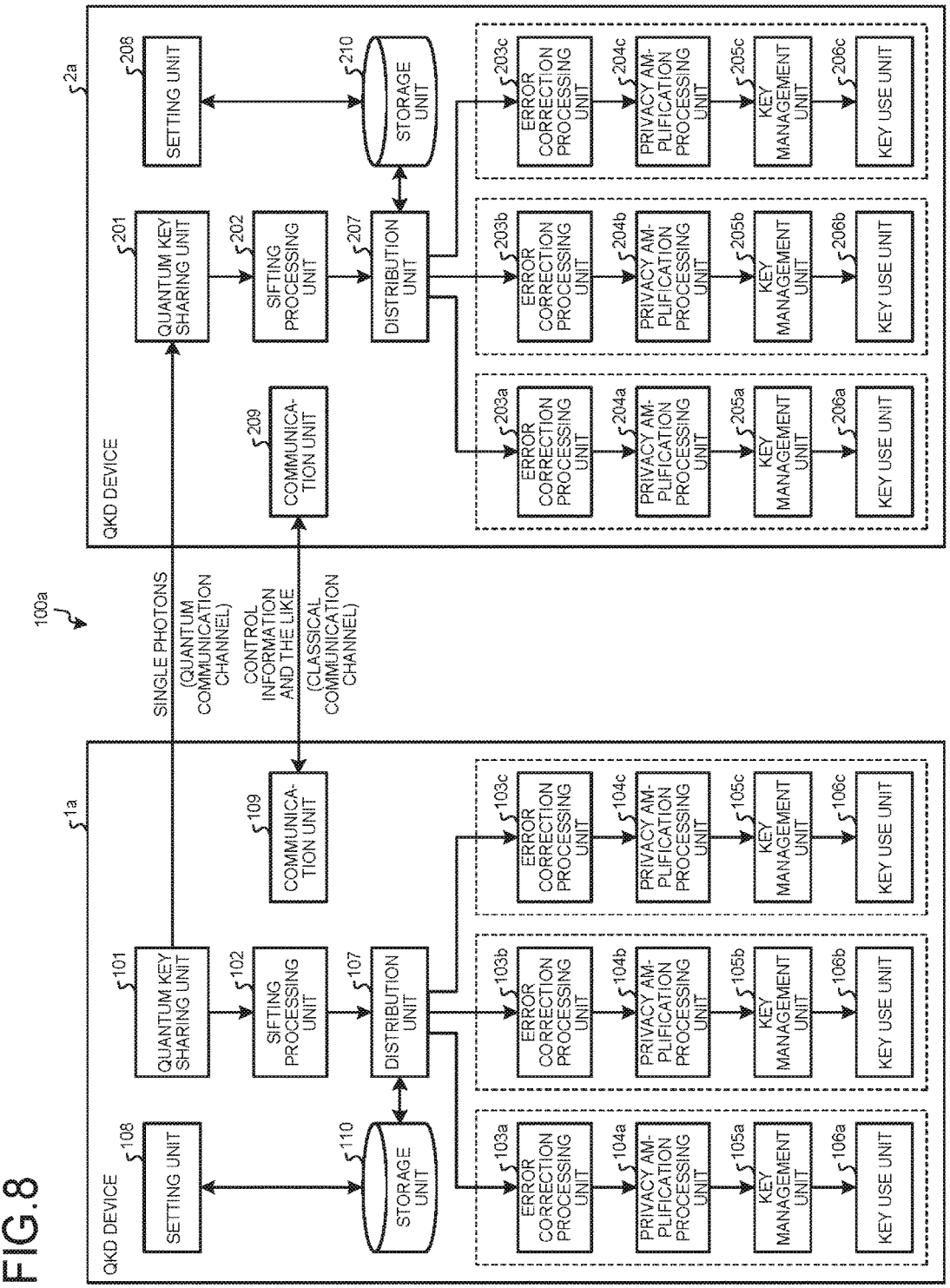
FIG. 8 is a diagram illustrating a functional block configuration of a QKD device according to a second embodiment.

FIG. 8 is a diagram illustrating an exemplary configuration of functional blocks of QKD devices according to the second embodiment. Referring to FIG. 8, the configuration of the functional blocks of the QKD devices (QKD devices 1a and 2a) according to the second embodiment is now described. Note that a difference from the functional block configuration and encryption key sharing operation of the general QKD device described above with reference to FIG. 3 and FIG. 4 is mainly described.

As illustrated in FIG. 8, the QKD devices 1a and 2a execute the photon transmission/reception processing and the sifting processing among the processing in the operation of the quantum encryption function including the quantum key distribution as the physical QKD devices as normal. However, the QKD devices 1a and 2a independently execute a part of the key distillation processing (error correction processing and privacy amplification processing), the key management, and the key use in accordance with different parameters and different variations as virtual QKD devices A1 and A2, virtual QKD devices B1 and B2, and virtual QKD devices C1 and C2, which are virtualized for the companies A to C, respectively. Parameters and variations for the error correction processing, the privacy amplification processing, the key management, and the key use are as described above with reference to FIG. 3. These parameters and variations are selected on the basis of respective request contents from operators of the virtual QKD devices A1 and A2, the virtual QKD devices B1 and B2, and the virtual QKD devices C1 and C2.

As illustrated in FIG. 8, the QKD device 1a of a quantum key distribution system 100a according to the second embodiment includes a quantum key sharing unit 101, a sifting processing unit 102, error correction processing units 103a to 103c, privacy amplification processing units 104a to 104c, key management units 105a to 105c, key use units 106a to 106c, a distribution unit 107, a setting unit 108, a communication unit 109, and a storage unit 110.

The functions and configurations of the quantum key sharing unit 101, the communication unit 109, and the storage unit 110 are the same as the functions and configurations of the quantum key sharing unit 101, the communication unit 109, and the storage unit 110 of the QKD device 1 according to the first embodiment, respectively.

The sifting processing unit 102 is a functional unit configured to execute the same sifting processing as that of the sifting processing unit 12 described above with reference to FIG. 3 as normal. Note that, in the case where the above-mentioned estimated error rate is calculated in the sifting processing, each of the shared bit strings to be generated is associated with a corresponding estimated error rate.

The functions and configurations of the error correction processing units 103a to 103c, the privacy amplification processing units 104a to 104c, the key management units 105a to 105c, and the key use units 106a to 106c are the same as the functions and configurations of the error correction processing units 103a to 103c, the privacy amplification processing units 104a to 104c, the key management units 105a to 105c, and the key use units 106a to 106c of the QKD device 1 according to the first embodiment, respectively. Specifically, the error correction processing units 103a to 103c, the privacy amplification processing units 104a to 104c, the key management units 105a to 105c, and the key use units 106a to 106c respective operate in accordance with parameters and variations that are set by the setting unit 108 on the basis of request contents from the companies A to C.

The setting unit 108 is a functional unit configured to set respective parameters and variations for error correction processing, privacy amplification processing, key management, and key use in accordance with respective request contents from the companies A to C.

The distribution unit 107 is a functional unit configured to distribute a shared bit string, which is intermediate data generated through the sifting processing by the sifting processing unit 102, to the error correction processing units 103a to 103c. The distribution unit 107 determines a method of distributing the shared bit string to the error correction processing units 103a to 103c in accordance with respective request contents from the companies A to C. In this case, the priorities associated with the companies A to C may be taken into consideration.

The criteria for determining the distribution method for the shared bit string to the error correction processing units 103a to 103c by the distribution unit 107 may include the same criteria as those in the above-mentioned first embodiment. In general, a shared bit string is a bit string after subjected to sifting processing, which is a sieving process, so that data directly related to photon transmission/reception processing, such as the bias of the basis, the proportion of decoy pulses and vacuum pulses, the dispersion of the decoy pulses, the dispersion of the vacuum pulses, and the dispersion of laser intensity, is removed therefrom. Accordingly, the criteria for determining the shared bit string distribution method that can be generally used are the key generation speed and the estimated error rate. The distribution based on the key generation speed is as described above in the first embodiment. The distribution based on the estimated error rate is now described.

In the error correction processing units 103a to 103c, the permissible range of an error rate for a shared bit string differs depending on a difference in error correction processing algorithm to be used. In the privacy amplification processing units 104a to 104c, the range of an error rate of a shared bit string that is advantageous for generation of an encryption key differs depending on a difference in privacy amplification processing algorithm based on the quantum cryptography theory to be used. For example, the error rate for the error correction processing unit 103a is desirably 2 to 5 [%], and an error rate of up to 10 [%] is permissible, but the error rate for the error correction processing unit 103b is desirably 2.5 to 3.0 [%], and an error rate of up to 6 [%] is permissible. In such a case, the distribution unit 107 determines which of the shared bit strings is distributed to the error correction processing unit 103a, 103b, or 103c on the basis of an estimated error rate calculated by the sifting processing unit 102. In this case, requests for key generation speed or priorities thereof associated with the companies A to C may be taken into consideration.

Note that FIG. 8 conceptually illustrates the functions of the quantum key sharing unit 101, the sifting processing unit 102, the error correction processing units 103a to 103c, the privacy amplification processing units 104a to 104c, the key management units 105a to 105c, the key use units 106a to 106c, the distribution unit 107, the setting unit 108, the communication unit 109, and the storage unit 110, and embodiments are not limited to these configurations. For example, in the QKD device 1a illustrated in FIG. 8, a plurality of functional units illustrated as independent functional units may be configured as a single functional unit. Alternatively, in the QKD device 1a illustrated in FIG. 8, the function of a single functional unit may be divided into a plurality of functions to be configured as a plurality of functional units.

As illustrated in FIG. 8, the QKD device 2a of the quantum key distribution system 100a according to the second embodiment includes a quantum key sharing unit 201, a sifting processing unit 202, error correction processing units 203a to 203c, privacy amplification processing units 204a to 204c, key management units 205a to 205c, key use units 206a to 206c, a distribution unit 207, a setting unit 208, a communication unit 209, and a storage unit 210.

The functions and configurations of the quantum key sharing unit 201, the communication unit 209, and the storage unit 210 are the same as the functions and configurations of the quantum key sharing unit 201, the communication unit 209, and the storage unit 210 of the QKD device 2 according to the first embodiment, respectively.

The sifting processing unit 202 is a functional unit configured to execute the same sifting processing as that of the sifting processing unit 22 described above with reference to FIG. 3 as normal. Note that, in the case where the above-mentioned estimated error rate is calculated in the sifting processing, each of the shared bit strings to be generated is associated with a corresponding estimated error rate.

The functions and configurations of the error correction processing units 203a to 203c, the privacy amplification processing units 204a to 204c, the key management units 205a to 205c, and the key use units 206a to 206c are the same as the functions and configurations of the error correction processing units 203a to 203c, the privacy amplification processing units 204a to 204c, the key management units 205a to 205c, and the key use units 206a to 206c of the QKD device 2 according to the first embodiment, respectively. Specifically, the error correction processing units 203a to 203c, the privacy amplification processing units 204a to 204c, the key management units 205a to 205c, and the key use units 206a to 206c respectively operate in accordance with parameters and variations that are set by the setting unit 208 on the basis of request contents from the companies A to C.

The setting unit 208 is a functional unit configured to set respective parameters and variations for error correction processing, privacy amplification processing, key management, and key use in accordance with respective request contents from the companies A to C.

The distribution unit 207 is a functional unit configured to distribute a shared bit string, which is intermediate data generated through the sifting processing by the sifting processing unit 202, to the error correction processing units 203a to 203c. The distribution unit 207 determines a method of distributing the shared bit string to the error correction processing units 203a to 203c in accordance with respective request contents from the companies A to C. A specific shared bit string distribution method by the distribution unit 207 is the same as the above-mentioned shared bit string distribution method by the distribution unit 107.

Note that FIG. 8 conceptually illustrate the functions of the quantum key sharing unit 201, the sifting processing unit 202, the error correction processing units 203a to 203c, the privacy amplification processing units 204a to 204c, the key management units 205a to 205c, the key use units 206a to 206c, the distribution unit 207, the setting unit 208, the communication unit 209, and the storage unit 210, and embodiments are not limited to these configurations. For example, in the QKD device 2a illustrated in FIG. 8, a plurality of functional units illustrated as independent functional units may be configured as a single functional unit. Alternatively, in the QKD device 2a illustrated in FIG. 8, the function of a single functional unit may be divided into a plurality of functions to be configured as a plurality of functional units.

Furthermore, in the second embodiment, the "common processing unit" in the present invention corresponds to the quantum key sharing unit 101 and the sifting processing unit 102 of the QKD device 1a, and the "individual processing units" correspond to the error correction processing units 103a to 103c and the subsequent processing units. The same applies to the QKD device 2a. Furthermore, in the second embodiment, the "first key distillation processing unit" in the present invention corresponds to the sifting processing unit 102 of the QKD device 1a, and the "second key distillation processing unit" corresponds to a series of processing units of the error correction processing units 103a to 103c and the privacy amplification processing units 104a to 104c, respectively. The same applies to the QKD device 2a.

As described above, also in the second embodiment, similarly to the first embodiment, a pair of physical QKD devices are virtualized so that a plurality of pairs of QKD devices (virtual QKD devices) seem to exist and a plurality of users or use organizations (in the example in the above-mentioned embodiment, companies) exclusively own the virtual QKD devices. Then, the virtual QKD devices exclusively owned by users or use organizations are respectively operated on the basis of different parameters and different variations in accordance with request contents from a plurality of users or use organizations. Particularly in the second embodiment, the virtual QKD devices are operated on the basis of different parameters and different variations for the error correction processing and subsequent processing among the processing of the quantum key distribution and the quantum encryption function. In this manner, the quantum key distribution and the quantum encryption function about the error correction processing and subsequent processing suited for respective request contents from a plurality of users and use organizations can be provided. Specifically, a pair of physical QKD devices can provide a plurality of actually different kinds of quantum key distribution and quantum encryption function. Other advantageous effects of the quantum key distribution system 100a according to the second embodiment are the same as those described above in the first embodiment.

Third Embodiment

A quantum key distribution system according to a third embodiment is now described, mainly focusing on a difference from the quantum key distribution system 100 according to the first embodiment. In the third embodiment, a description is given of the configuration in which the operation of privacy amplification processing and subsequent processing among the processing of the quantum key distribution and the quantum encryption function is executed in accordance with parameters and variations that differ from one company to another. Note that the overall configuration of the quantum key distribution system, the hardware configuration of the QKD devices, and the virtualization mode of the quantum key distribution and the quantum encryption function according to the third embodiment are the same as those in the first embodiment.

Figure 9:
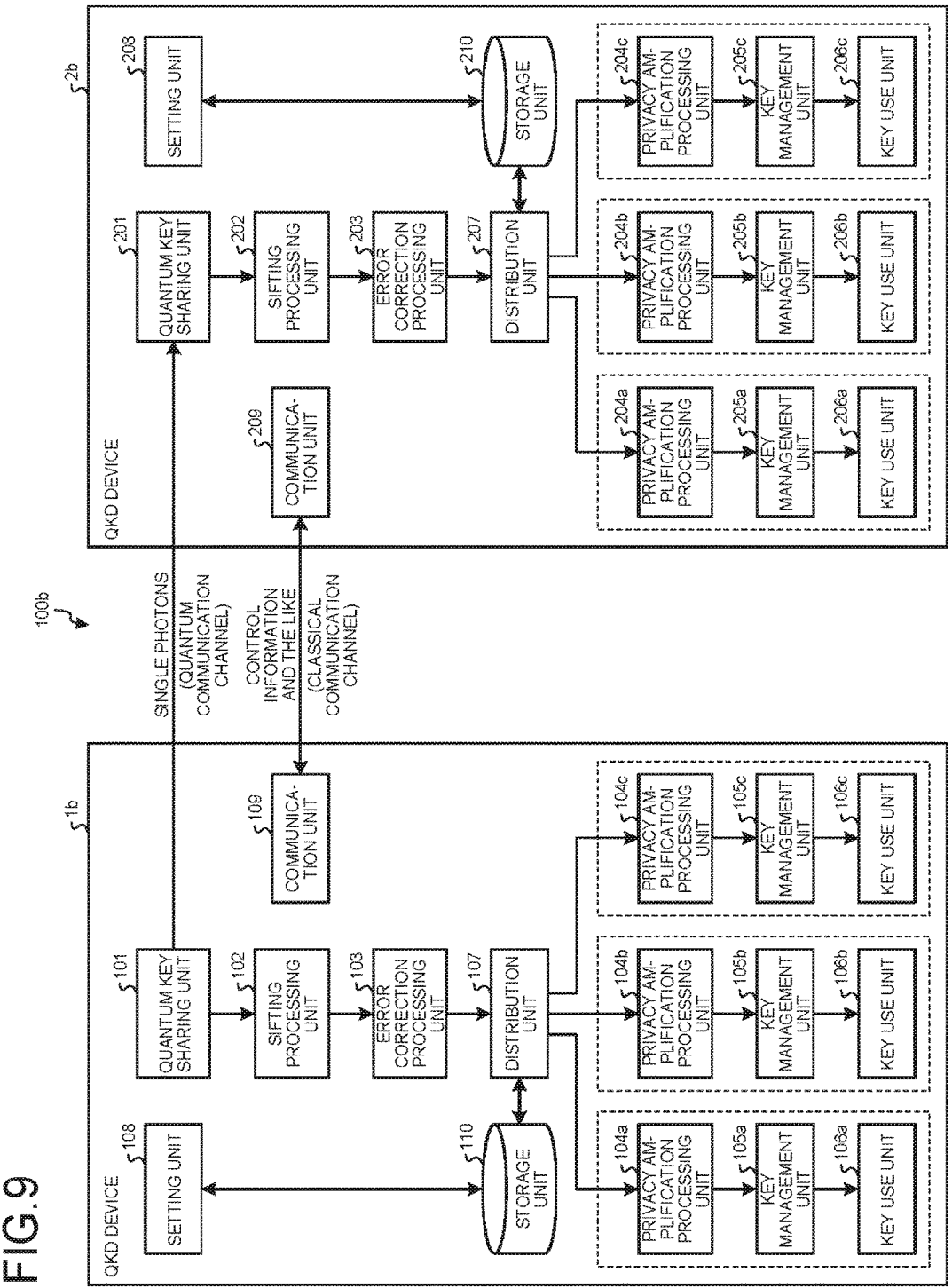
FIG. 9 is a diagram illustrating a functional block configuration of a QKD device according to a third embodiment.

FIG. 9 is a diagram illustrating an exemplary configuration of functional blocks of QKD devices according to the third embodiment. Referring to FIG. 9, the configuration of the functional blocks of the QKD devices (QKD devices 1b and 2b) according to the third embodiment is now described. Note that a difference from the functional block configuration and encryption key sharing operation of the general QKD device described above with reference to FIG. 3 and FIG. 4 is mainly described.

As illustrated in FIG. 9, the QKD devices 1b and 2b execute the photon transmission/reception processing, the sifting processing, and the error correction processing among the processing in the operation of the quantum encryption function including the quantum key distribution as the physical QKD devices as normal. However, the QKD devices 1b and 2b independently execute privacy amplification processing in the key distillation processing, key management, and key use in accordance with different parameters and different variations as virtual QKD devices A1 and A2, virtual QKD devices B1 and B2, and virtual QKD devices C1 and C2, which are virtualized for the companies A to C, respectively. Parameters and variations for the privacy amplification processing, the key management, and the key use are as described above with reference to FIG. 3. These parameters and variations are selected on the basis of respective request contents from operators of the virtual QKD devices A1 and A2, the virtual QKD devices B1 and B2, and the virtual QKD devices C1 and C2.

As illustrated in FIG. 9, the QKD device 1b of a quantum key distribution system 100b according to the third embodiment includes a quantum key sharing unit 101, a sifting processing unit 102, an error correction processing unit 103, privacy amplification processing units 104a to 104c, key management units 105a to 105c, key use units 106a to 106c, a distribution unit 107, a setting unit 108, a communication unit 109, and a storage unit 110.

The functions and configurations of the quantum key sharing unit 101, the communication unit 109, and the storage unit 110 are the same as the functions and configurations of the quantum key sharing unit 101, the communication unit 109, and the storage unit 110 of the QKD device 1 according to the first embodiment, respectively.

The sifting processing unit 102 is a functional unit configured to execute the same sifting processing as that of the sifting processing unit 12 described above with reference to FIG. 3 as normal. Note that, in the case where the above-mentioned estimated error rate is calculated in the sifting processing, each of the shared bit strings to be generated is associated with a corresponding estimated error rate.

The error correction processing unit 103 is a functional unit configured to execute the same error correction processing as that of the error correction processing unit 13 described above with reference to FIG. 3 as normal. Note that each of the corrected bit strings generated as a result of the error correction processing is associated with an error rate representing how many errors are included.

The functions and configurations of the privacy amplification processing units 104a to 104c, the key management units 105a to 105c, and the key use units 106a to 106c are the same as the functions and configurations of the privacy amplification processing units 104a to 104c, the key management units 105a to 105c, and the key use units 106a to 106c of the QKD device 1 according to the first embodiment, respectively. Specifically, the privacy amplification processing units 104a to 104c, the key management units 105a to 105c, and the key use units 106a to 106c respectively operate in accordance with parameters and variations that are set by the setting unit 108 based on request contents from the companies A to C.

The setting unit 108 is a functional unit configured to set respective parameters and variations for privacy amplification processing, key management, and key use in accordance with respective request contents from the companies A to C.

The distribution unit 107 is a functional unit configured to distribute a corrected bit string, which is intermediate data generated through the error correction processing by the error correction processing unit 103, to the privacy amplification processing units 104a to 104c. The distribution unit 107 determines a method of distributing the corrected bit string to the privacy amplification processing units 104a to 104c in accordance with respective request contents from the companies A to C. In this case, the priorities associated with the companies A to C may be taken into consideration.

The criteria for determining the distribution method for the corrected bit string to the privacy amplification processing units 104a to 104c by the distribution unit 107 may include the same criteria as those in the above-mentioned first embodiment. The criteria for determining the corrected bit string distribution method that can be generally used are the key generation speed and the error rate. The distribution of the corrected bit string based on the key generation speed is as described above in the first embodiment. The distribution of the corrected bit string based on the error rate is the same as that based on the estimated error rate in the above-mentioned second embodiment. The difference between the estimated error rate and the error rate is that the estimated error rate is an estimated value but the error rate obtained as a result of the error correction processing is based on the number of errors strictly included in the shared bit string.

Note that FIG. 9 conceptually illustrates the functions of the quantum key sharing unit 101, the sifting processing unit 102, the error correction processing unit 103, the privacy amplification processing units 104a to 104c, the key management units 105a to 105c, the key use units 106a to 106c, the distribution unit 107, the setting unit 108, the communication unit 109, and the storage unit 110, and embodiments are not limited to these configurations. For example, in the QKD device 1b illustrated in FIG. 9, a plurality of functional units illustrated as independent functional units may be configured as a single functional unit. Alternatively, in the QKD device 1b illustrated in FIG. 9, the function of a single functional unit may be divided into a plurality of functions to be configured as a plurality of functional units.

As illustrated in FIG. 9, the QKD device 2b of the quantum key distribution system 100b according to the third embodiment includes a quantum key sharing unit 201, a sifting processing unit 202, an error correction processing unit 203, privacy amplification processing units 204a to 204c, key management units 205a to 205c, key use units 206a to 206c, a distribution unit 207, a setting unit 208, a communication unit 209, and a storage unit 210.

The functions and configurations of the quantum key sharing unit 201, the communication unit 209, and the storage unit 210 are the same as the functions and configurations of the quantum key sharing unit 201, the communication unit 209, and the storage unit 210 of the QKD device 2 according to the first embodiment, respectively.

The sifting processing unit 202 is a functional unit configured to execute the same sifting processing as that of the sifting processing unit 22 described above with reference to FIG. 3 as normal. Note that, in the case where the above-mentioned estimated error rate is calculated in the sifting processing, each of the shared bit strings to be generated is associated with a corresponding estimated error rate.

The error correction processing unit 203 is a functional unit configured to execute the same error correction processing as that of the error correction processing unit 23 described above with reference to FIG. 3 as normal. Note that each of the corrected bit strings generated as a result of the error correction processing is associated with an error rate representing how many errors are included.

The functions and configurations of the privacy amplification processing units 204a to 204c, the key management units 205a to 205c, and the key use units 206a to 206c are the same as the functions and configurations of the privacy amplification processing units 204a to 204c, the key management units 205a to 205c, and the key use units 206a to 206c of the QKD device 2 according to the first embodiment, respectively. Specifically, the privacy amplification processing units 204a to 204c, the key management units 205a to 205c, and the key use units 206a to 206c respectively operate in accordance with parameters and variations that are set by the setting unit 208 based on request contents from the companies A to C.

The setting unit 208 is a functional unit configured to set respective parameters and variations for privacy amplification processing, key management, and key use in accordance with respective request contents from the companies A to C.

The distribution unit 207 is a functional unit configured to distribute a corrected bit string, which is intermediate data generated through the error correction processing by the error correction processing unit 203, to the privacy amplification processing units 204a to 204c. The distribution unit 207 determines a method of distributing the corrected bit string to the privacy amplification processing units 204a to 204c in accordance with respective request contents from the companies A to C. A specific corrected bit string distribution method by the distribution unit 207 is the same as the above-mentioned corrected bit string distribution method by the distribution unit 107.

Note that FIG. 9 conceptually illustrates the functions of the quantum key sharing unit 201, the sifting processing unit 202, the error correction processing unit 203, the privacy amplification processing units 204a to 204c, the key management units 205a to 205c, the key use units 206a to 206c, the distribution unit 207, the setting unit 208, the communication unit 209, and the storage unit 210, and embodiments are not limited to these configurations. For example, in the QKD device 2b illustrated in FIG. 9, a plurality of functional units illustrated as independent functional units may be configured as a single functional unit. Alternatively, in the QKD device 2b illustrated in FIG. 9, the function of a single functional unit may be divided into a plurality of functions to be configured as a plurality of functional units.

Furthermore, in the third embodiment, the "common processing unit" in the present invention corresponds to the quantum key sharing unit 101, the sifting processing unit 102, and the error correction processing unit 103 of the QKD device 1b, and the "individual processing units" correspond to the privacy amplification processing units 104a to 104c and the subsequent processing units. The same applies to the QKD device 2b. Furthermore, in the third embodiment, the "first key distillation processing unit" in the present invention corresponds to the sifting processing unit 102 and the error correction processing unit 103 of the QKD device 1b, and the "second key distillation processing units" correspond to the privacy amplification processing units 104a to 104c, respectively. The same applies to the QKD device 2b.

As described above, also in the third embodiment, similarly to the first embodiment, a pair of physical QKD devices are virtualized so that a plurality of pairs of QKD devices (virtual QKD devices) seem to exist and a plurality of users or use organizations (in the example in the above-mentioned embodiment, companies) exclusively own the virtual QKD devices. Then, the virtual QKD devices exclusively owned by users or use organizations are respectively operated on the basis of different parameters and different variations in accordance with request contents from a plurality of users or use organizations. Particularly in the third embodiment, the virtual QKD devices are operated on the basis of different parameters and different variations for the privacy amplification processing and subsequent processing among the processing of the quantum key distribution and the quantum encryption function. In this manner, the quantum key distribution and the quantum encryption function about the privacy amplification processing and subsequent processing suited for respective request contents from a plurality of users and use organizations can be provided. Specifically, a pair of physical QKD devices can provide a plurality of actually different kinds of quantum key distribution and quantum encryption function. Other advantageous effects of the quantum key distribution system 100b according to the third embodiment are the same as those described above in the first embodiment.

Fourth Embodiment

A quantum key distribution system according to a fourth embodiment is now described, mainly focusing on a difference from the quantum key distribution system 100 according to the first embodiment. In the fourth embodiment, a description is given of the configuration in which the operation of the processing of key management and key use among the processing of the quantum encryption function is executed in accordance with parameters and variations that differ from one company to another. Note that the overall configuration of the quantum key distribution system, the hardware configuration of the QKD devices, and the virtualization mode of the quantum key distribution and the quantum encryption function according to the fourth embodiment are the same as those in the first embodiment.

Figure 10:
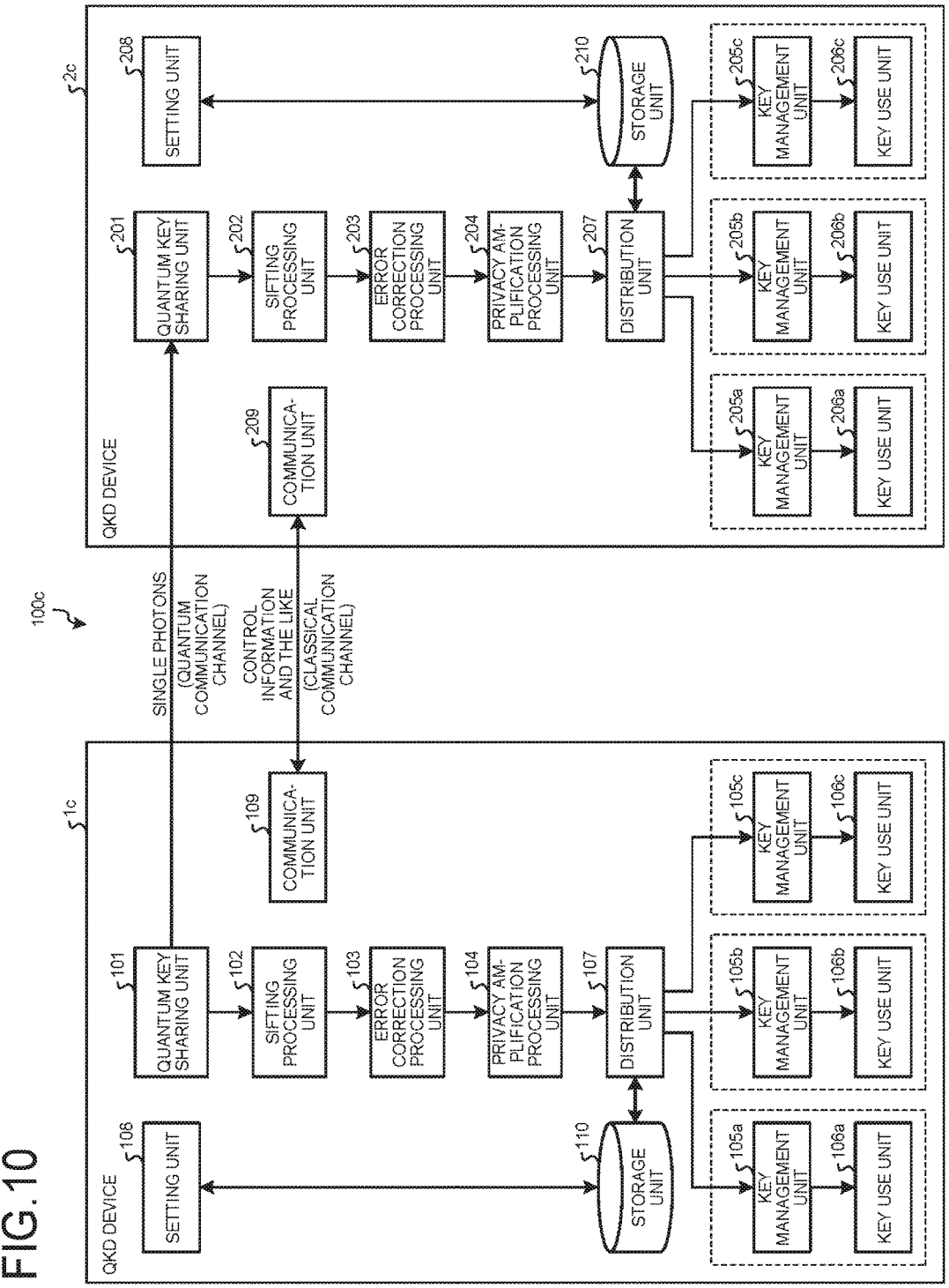
FIG. 10 is a diagram illustrating a functional block configuration of a QKD device according to a fourth embodiment.

FIG. 10 is a diagram illustrating an exemplary configuration of functional blocks of QKD devices according to the fourth embodiment. Referring to FIG. 10, the configuration of the functional blocks of the QKD devices (QKD devices 1c and 2c) of according to the fourth embodiment is now described. Note that a difference from the functional block configuration and encryption key sharing operation of the general QKD device described above with reference to FIG. 3 and FIG. 4 is mainly described.

As illustrated in FIG. 10, the QKD devices 1c and 2c execute the photon transmission/reception processing, the sifting processing, the error correction processing, and the privacy amplification processing among the processing in the operation of the quantum encryption function including the quantum key distribution as the physical QKD devices as normal. However, the QKD devices 1c and 2c independently execute the key management and the key use in accordance with different parameters and different variations as virtual QKD devices A1 and A2, virtual QKD devices B1 and B2, and virtual QKD devices C1 and C2, which are virtualized for the companies A to C. Parameters and variations for the key management and the key use are as described above with reference to FIG. 3. These parameters and variations are selected on the basis of respective request contents from operators of the virtual QKD device A1 and A2, the virtual QKD devices B1 and B2, and the virtual QKD devices C1 and C2.

As illustrated in FIG. 10, the QKD device 1c of a quantum key distribution system 100c according to the fourth embodiment includes a quantum key sharing unit 101, a sifting processing unit 102, an error correction processing unit 103, a privacy amplification processing unit 104, key management units 105a to 105c, key use units 106a to 106c, a distribution unit 107, a setting unit 108, a communication unit 109, and a storage unit 110.

The functions and configurations of the quantum key sharing unit 101, the communication unit 109, and the storage unit 110 are the same as the functions and configurations of the quantum key sharing unit 101, the communication unit 109, and the storage unit 110 of the QKD device 1 according to the first embodiment, respectively.

The sifting processing unit 102 is a functional unit configured to execute the same sifting processing as that of the sifting processing unit 12 described above with reference to FIG. 3 as normal. Note that, in the case where the above-mentioned estimated error rate is calculated in the sifting processing, each of the shared bit strings to be generated is associated with a corresponding estimated error rate.

The error correction processing unit 103 is a functional unit configured to execute the same error correction processing as that of the error correction processing unit 13 described above with reference to FIG. 3 as normal. Note that each of the corrected bit strings generated as a result of the error correction processing is associated with an error rate representing how many errors are included.

The privacy amplification processing unit 104 is a functional unit configured to execute the same privacy amplification processing as that of the privacy amplification processing unit 14 described above with reference to FIG. 3 as normal.

The functions and configurations of the key management units 105a to 105c and the key use units 106a to 106c are the same as the functions and configurations of the key management units 105a to 105c and the key use units 106a to 106c of the QKD device 1 according to the first embodiment, respectively. Specifically, the key management units 105a to 105c and the key use units 106a to 106c respectively operate in accordance with parameters and variations that are set by the setting unit 108 based on request contents from the companies A to C.

The setting unit 108 is a functional unit configured to set respective parameters and variations for key management and key use in accordance with respective request contents from the companies A to C.

The distribution unit 107 is a functional unit configured to distribute an encryption key, which is intermediate data generated through the privacy amplification processing by the privacy amplification processing unit 104, to the key management units 105a to 105c. The distribution unit 107 determines a method of distributing the encryption key to the key management units 105a to 105c in accordance with respective request contents from the companies A to C. In this case, the priorities associated with the companies A to C may be taken into consideration.

The criteria for determining the distribution method for the encryption key to the key management units 105a to 105c by the distribution unit 107 may include the same criteria as those in the above-mentioned first embodiment. The criteria for determining the encryption key distribution method that can be generally used are the key generation speed and the error rate. The distribution based on the key generation speed is as described above in the first embodiment. The distribution based on the error rate is as described above in the third embodiment.

Note that FIG. 10 conceptually illustrates the functions of the quantum key sharing unit 101, the sifting processing unit 102, the error correction processing unit 103, the privacy amplification processing unit 104, the key management units 105a to 105c, the key use units 106a to 106c, the distribution unit 107, the setting unit 108, the communication unit 109, and the storage unit 110, and embodiments are not limited to these configurations. For example, in the QKD device 1c illustrated in FIG. 10, a plurality of functional units illustrated as independent functional units may be configured as a single functional unit. Alternatively, in the QKD device 1c illustrated in FIG. 10, the function of a single functional unit may be divided into a plurality of functions to be configured as a plurality of functional units.

As illustrated in FIG. 10, the QKD device 2c of the quantum key distribution system 100c according to the fourth embodiment includes a quantum key sharing unit 201, a sifting processing unit 202, an error correction processing unit 203, a privacy amplification processing unit 204, key management units 205a to 205c, key use units 206a to 206c, a distribution unit 207, a setting unit 208, a communication unit 209, and a storage unit 210.

The functions and configurations of the quantum key sharing unit 201, the communication unit 209, and the storage unit 210 are the same as the functions and configurations of the quantum key sharing unit 201, the communication unit 209, and the storage unit 210 of the QKD device 2 according to the first embodiment, respectively.

The sifting processing unit 202 is a functional unit configured to execute the same sifting processing as that of the sifting processing unit 22 described above with reference to FIG. 3 as normal. Note that, in the case where the above-mentioned estimated error rate is calculated in the sifting processing, each of the shared bit strings to be generated is associated with a corresponding estimated error rate.

The error correction processing unit 203 is a functional unit configured to execute the same error correction processing as that of the error correction processing unit 23 described above with reference to FIG. 3 as normal. Note that each of the corrected bit strings generated as a result of the error correction processing is associated with an error rate representing how many errors are included.

The privacy amplification processing unit 204 is a functional unit configured to execute the same privacy amplification processing as that of the privacy amplification processing unit 24 described above with reference to FIG. 3 as normal.

The functions and configurations of the key management units 205a to 205c and the key use units 206a to 206c are the same as the functions and configurations of the key management units 205a to 205c and the key use units 206a to 206c of the QKD device 2 according to the first embodiment, respectively. Specifically, the key management units 205a to 205c and the key use units 206a to 206c respectively operate in accordance with parameters and variations that are set by the setting unit 208 based on request contents from the companies A to C.

The setting unit 208 is a functional unit configured to set respective parameters and variations for key management and key use in accordance with respective request contents from the companies A to C.

The distribution unit 207 is a functional unit configured to distribute an encryption key generated through the privacy amplification processing by the privacy amplification processing unit 204 to the key management units 205a to 205c. The distribution unit 207 determines a method of distributing the encryption key to the key management units 205a to 205c in accordance with respective request contents from the companies A to C. A specific encryption key distribution method by the distribution unit 207 is the same as the above-mentioned encryption key distribution method by the distribution unit 107.

Note that FIG. 10 conceptually illustrates the functions of the quantum key sharing unit 201, the sifting processing unit 202, the error correction processing unit 203, the privacy amplification processing unit 204, the key management units 205a to 205c, the key use units 206a to 206c, the distribution unit 207, the setting unit 208, the communication unit 209, and the storage unit 210, and embodiments are not limited to these configurations. For example, in the QKD device 2c illustrated in FIG. 10, a plurality of functional units illustrated as independent functional units may be configured as a single functional unit. Alternatively, in the QKD device 2c illustrated in FIG. 10, the function of a single functional unit may be divided into a plurality of functions to be configured as a plurality of functional units.

Furthermore, in the fourth embodiment, the "common processing unit" in the present invention corresponds to the quantum key sharing unit 101, the sifting processing unit 102, the error correction processing unit 103, and the privacy amplification processing unit 104 of the QKD device 1c, and the "individual processing units" correspond to the key management units 105a to 105c and the subsequent processing units. The same applies to the QKD device 2c. Furthermore, in the fourth embodiment, the "key distillation processing unit" in the present invention corresponds to the sifting processing unit 102, the error correction processing unit 103, and the privacy amplification processing unit 104 of the QKD device 1c. The same applies to the QKD device 2c.

As described above, also in the fourth embodiment, similarly to the first embodiment, a pair of physical QKD devices are virtualized so that a plurality of pairs of QKD devices (virtual QKD devices) seem to exist and a plurality of users or use organizations (in the example in the above-mentioned embodiment, companies) exclusively own the virtual QKD devices. Then, the virtual QKD devices exclusively owned by users or use organizations are respectively operated on the basis of different parameters and different variations in accordance with request contents from a plurality of users or use organizations. Particularly in the fourth embodiment, the virtual QKD devices are operated on the basis of different parameters and different variations for the processing of key management and key use among the processing of the quantum encryption function. In this manner, the quantum encryption function about the key management and the key use suited for respective request contents from a plurality of users and use organizations can be provided. Specifically, a pair of physical QKD devices can provide a plurality of actually different kinds of quantum key distribution and quantum encryption function. Other advantageous effects of the quantum key distribution system 100c according to the fourth embodiment are the same as those described above in the first embodiment.

Fifth Embodiment

A quantum key distribution system according to a fifth embodiment is now described, mainly focusing on a difference from the quantum key distribution system 100 according to the first embodiment. In the fifth embodiment, a description is given of the configuration in which the operation of the key use among the processing of the quantum encryption function is executed in accordance with parameters and variations that differ from one company to another. Note that the overall configuration of the quantum key distribution system, the hardware configuration of the QKD device, and the virtualization mode of the quantum key distribution and the quantum encryption function according to the fifth embodiment are the same as those in the first embodiment.

Figure 11:
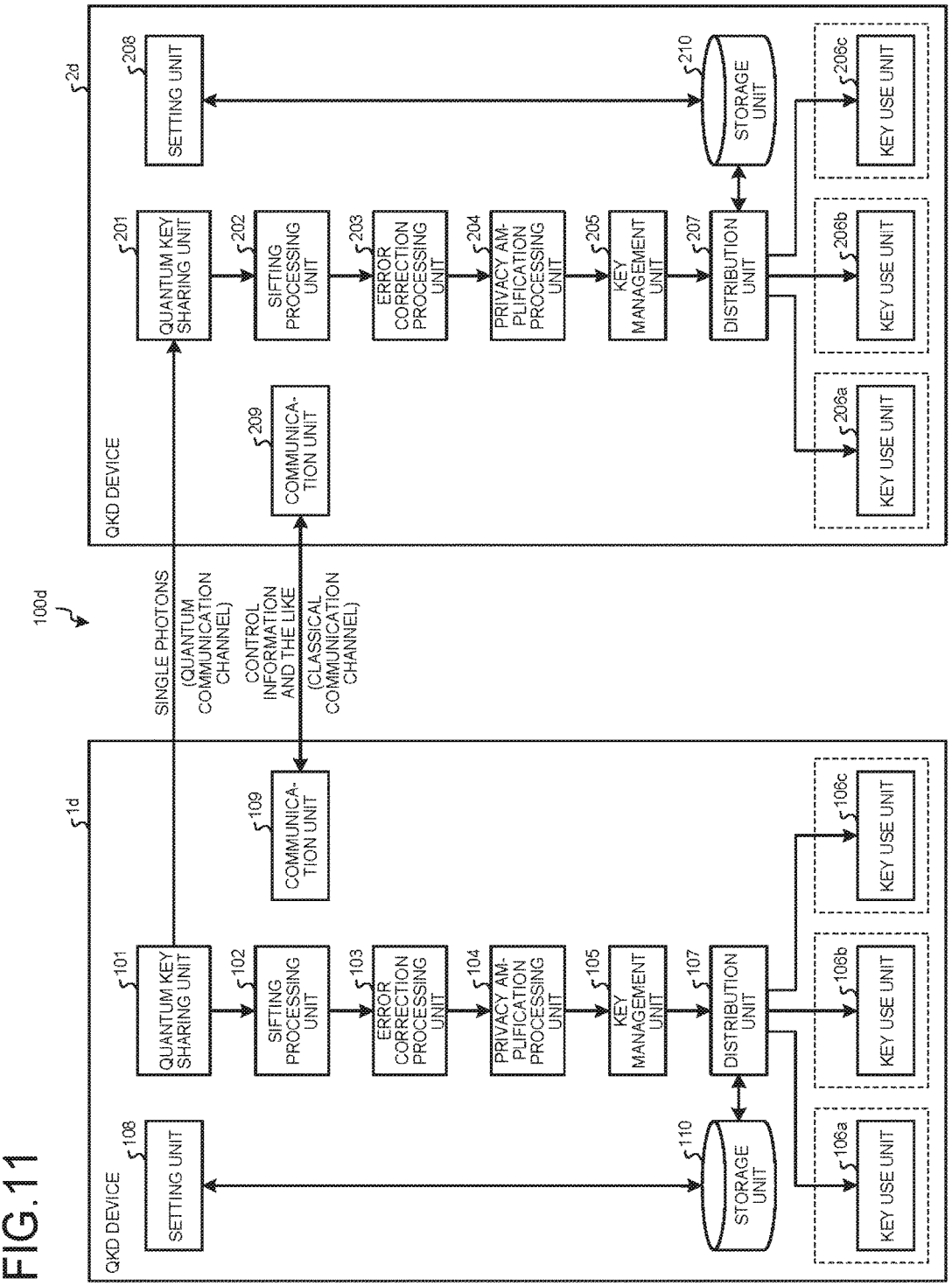
FIG. 11 is a diagram illustrating a functional block configuration of a QKD device according to a fifth embodiment.

FIG. 11 is a diagram illustrating an exemplary configuration of functional blocks of QKD devices according to the fifth embodiment. Referring to FIG. 11, the configuration of the functional blocks of the QKD devices (QKD devices 1d and 2d) according to the fifth embodiment is now described. Note that a difference from the functional block configuration and encryption key sharing operation of the general QKD device described above with reference to FIG. 3 and FIG. 4 is mainly described.

As illustrated in FIG. 11, the QKD devices 1d and 2d execute the photon transmission/reception processing, the sifting processing, the error correction processing, the privacy amplification processing, and the key management among the processing in the quantum encryption function including the quantum key distribution as the physical QKD devices as normal. However, the QKD devices 1d and 2d independently execute the key use in accordance with different parameters and different variations as virtual QKD devices A1 and A2, virtual QKD devices B1 and B2, and virtual QKD devices C1 and C2, which are virtualized for the companies A to C, respectively. Parameters and variations for the key use are as described above with reference to FIG. 3. These parameters and variations are selected on the basis of respective request contents from operators of the virtual QKD devices A1 and A2, the virtual QKD devices B1 and B2, and the virtual QKD devices C1 and C2.

As illustrated in FIG. 11, the QKD device 1d of a quantum key distribution system 100d according to the fifth embodiment includes a quantum key sharing unit 101, a sifting processing unit 102, an error correction processing unit 103, a privacy amplification processing unit 104, a key management unit 105, key use units 106a to 106c, a distribution unit 107, a setting unit 108, a communication unit 109, and a storage unit 110.

The functions and configurations of the quantum key sharing unit 101, the communication unit 109, and the storage unit 110 are the same as the functions and configurations of the quantum key sharing unit 101, the communication unit 109, and the storage unit 110 of the QKD device 1 according to the first embodiment, respectively.

The sifting processing unit 102 is a functional unit configured to execute the same sifting processing as that of the sifting processing unit 12 described above with reference to FIG. 3 as normal. Note that, in the case where the above-mentioned estimated error rate is calculated in the sifting processing, each of the shared bit strings to be generated is associated with a corresponding estimated error rate.

The error correction processing unit 103 is a functional unit configured to execute the same error correction processing as that of the error correction processing unit 13 described above with reference to FIG. 3 as normal. Note that each of the corrected bit strings generated as a result of the error correction processing is associated with an error rate representing how many errors are included.

The privacy amplification processing unit 104 is a functional unit configured to execute the same privacy amplification processing as that of the privacy amplification processing unit 14 described above with reference to FIG. 3 as normal.

The key management unit 105 is a functional unit configured to execute the same key management as that of the key management unit 15 described above with reference to FIG. 3 as normal.

The functions and configurations of the key use units 106a to 106c are the same as the functions and configurations of the key use units 106a to 106c of the QKD device 1 according to the first embodiment, respectively. Specifically, the key use units 106a to 106c respectively operate in accordance with parameters and variations that are set by the setting unit 108 based on request contents from the companies A to C.

The setting unit 108 is a functional unit configured to set respective parameters and variations for key use in accordance with respective request contents from the companies A to C.

The distribution unit 107 is a functional unit configured to an encryption key, which is intermediate data provided from the key management unit 105, to the key use units 106a to 106c. The distribution unit 107 determines a method of distributing the encryption key to the key use units 106a to 106c in accordance with respective request contents from the companies A to C. In this case, the priorities associated with the companies A to C may be taken into consideration.

The criteria for determining the distribution method for the encryption key to the key use units 106a to 106c by the distribution unit 107 may include the same criteria as those in the above-mentioned fourth embodiment.

Note that FIG. 11 conceptually illustrates the functions of the quantum key sharing unit 101, the sifting processing unit 102, the error correction processing unit 103, the privacy amplification processing unit 104, the key management unit 105, the key use units 106a to 106c, the distribution unit 107, the setting unit 108, the communication unit 109, and the storage unit 110, and embodiments are not limited to these configurations. For example, in the QKD device 1d illustrated in FIG. 11, a plurality of functional units illustrated as independent functional units may be configured as a single functional unit. Alternatively, in the QKD device 1d illustrated in FIG. 11, the function of a single functional unit may be divided into a plurality of functions to be configured as a plurality of functional units.

As illustrated in FIG. 11, the QKD device 2d of the quantum key distribution system 100d according to the fifth embodiment includes a quantum key sharing unit 201, a sifting processing unit 202, an error correction processing unit 203, a privacy amplification processing unit 204, a key management unit 205, key use units 206a to 206c, a distribution unit 207, a setting unit 208, a communication unit 209, and a storage unit 210.

The functions and configurations of the quantum key sharing unit 201, the communication unit 209, and the storage unit 210 are the same as the functions and configurations of the quantum key sharing unit 201, the communication unit 209, and the storage unit 210 of the QKD device 2 according to the first embodiment, respectively.

The sifting processing unit 202 is a functional unit configured to execute the same sifting processing as that of the sifting processing unit 22 described above with reference to FIG. 3 as normal. Note that, in the case where the above-mentioned estimated error rate is calculated in the sifting processing, each of the shared bit strings to be generated is associated with a corresponding estimated error rate.

The error correction processing unit 203 is a functional unit configured to execute the same error correction processing as that of the error correction processing unit 23 described above with reference to FIG. 3 as normal. Note that each of the corrected bit strings generated as a result of the error correction processing is associated with an error rate representing how many errors are included.

The privacy amplification processing unit 204 is a functional unit configured to execute the same privacy amplification processing as that of the privacy amplification processing unit 24 described above with reference to FIG. 3 as normal.

The key management unit 205 is a functional unit configured to execute the same key management as that of the key management unit 25 described above with reference to FIG. 3 as normal.

The functions and configurations of the key use units 206a to 206c are the same as the functions and configurations of the key use units 206a to 206c of the QKD device 2 according to the first embodiment, respectively. Specifically, the key use units 206a to 206c respectively operate in accordance with parameters and variations that are set by the setting unit 208 based on request contents from the companies A to C.

The setting unit 208 is a functional unit configured to set respective parameters and variations for key use in accordance with respective request contents from the companies A to C.

The distribution unit 207 is a functional unit configured to distribute an encryption key provided from the key management unit 205 to the key use units 206a to 206c. The distribution unit 207 determines a method of distributing the encryption key to the key use units 206a to 206c in accordance with respective request contents from the companies A to C. A specific encryption key distribution method by the distribution unit 207 is the same as the above-mentioned encryption key distribution method by the distribution unit 107.

Note that FIG. 11 conceptually illustrates the functions of the quantum key sharing unit 201, the sifting processing unit 202, the error correction processing unit 203, the privacy amplification processing unit 204, the key management unit 205, the key use units 206a to 206c, the distribution unit 207, the setting unit 208, the communication unit 209, and the storage unit 210, and embodiments are not limited to these configurations. For example, in the QKD device 2d illustrated in FIG. 11, a plurality of functional units illustrated as independent functional units may be configured as a single functional unit. Alternatively, in the QKD device 2d illustrated in FIG. 11, the function of a single functional unit may be divided into a plurality of functions to be configured as a plurality of functional units.

Furthermore, in the fifth embodiment, the "common processing unit" in the present invention corresponds to the quantum key sharing unit 101, the sifting processing unit 102, the error correction processing unit 103, the privacy amplification processing unit 104, and the key management unit 105 of the QKD device 1d, and the individual processing units" correspond to the key use units 106a to 106c. The same applies to the QKD device 2d.

As described above, also in the fifth embodiment, similarly to the first embodiment, a pair of physical QKD devices are virtualized so that a plurality of pairs of QKD devices (virtual QKD devices) seem to exist and a plurality of users or use organizations (in the example in the above-mentioned embodiment, companies) exclusively own the virtual QKD devices. Then, the virtual QKD devices exclusively owned by users or use organizations are respectively operated on the basis of different parameters and different variations in accordance with request contents from a plurality of users or use organizations. Particularly in the fifth embodiment, the virtual QKD devices are operated on the basis of different parameters and different variations for the processing of key use among the processing of the quantum encryption function. In this manner, the quantum encryption function about the key use suited for respective request contents from a plurality of users and use organizations can be provided. Specifically, a pair of physical QKD devices can provide a plurality of actually different kinds of quantum key distribution and quantum encryption function. Other advantageous effects of the quantum key distribution system 100d according to the fifth embodiment are the same as those described above in the first embodiment.

Sixth Embodiment

A quantum key distribution system according to a sixth embodiment is now described, mainly focusing on a difference from the quantum key distribution system 100 according to the first embodiment. In the first embodiment, a description has been given of the configuration in which the operation of the sifting processing and subsequent processing among the processing of the quantum key distribution and the quantum encryption function is executed on virtual QKD devices in accordance with different parameters and different variations in order to respond to request contents from respective companies. In the sixth embodiment, a description is given of how physical QKD devices are configured so as to meet request contents from companies (operators) for operation on virtual QKD devices (such as a request, a policy, and a service-level agreement agreed with a provider of QKD devices from a company). Note that the overall configuration of the quantum key distribution system, the hardware configuration of the QKD devices, and the virtualization mode of the quantum key distribution and the quantum encryption function according to the sixth embodiment are the same as those in the first embodiment.

Figure 12:
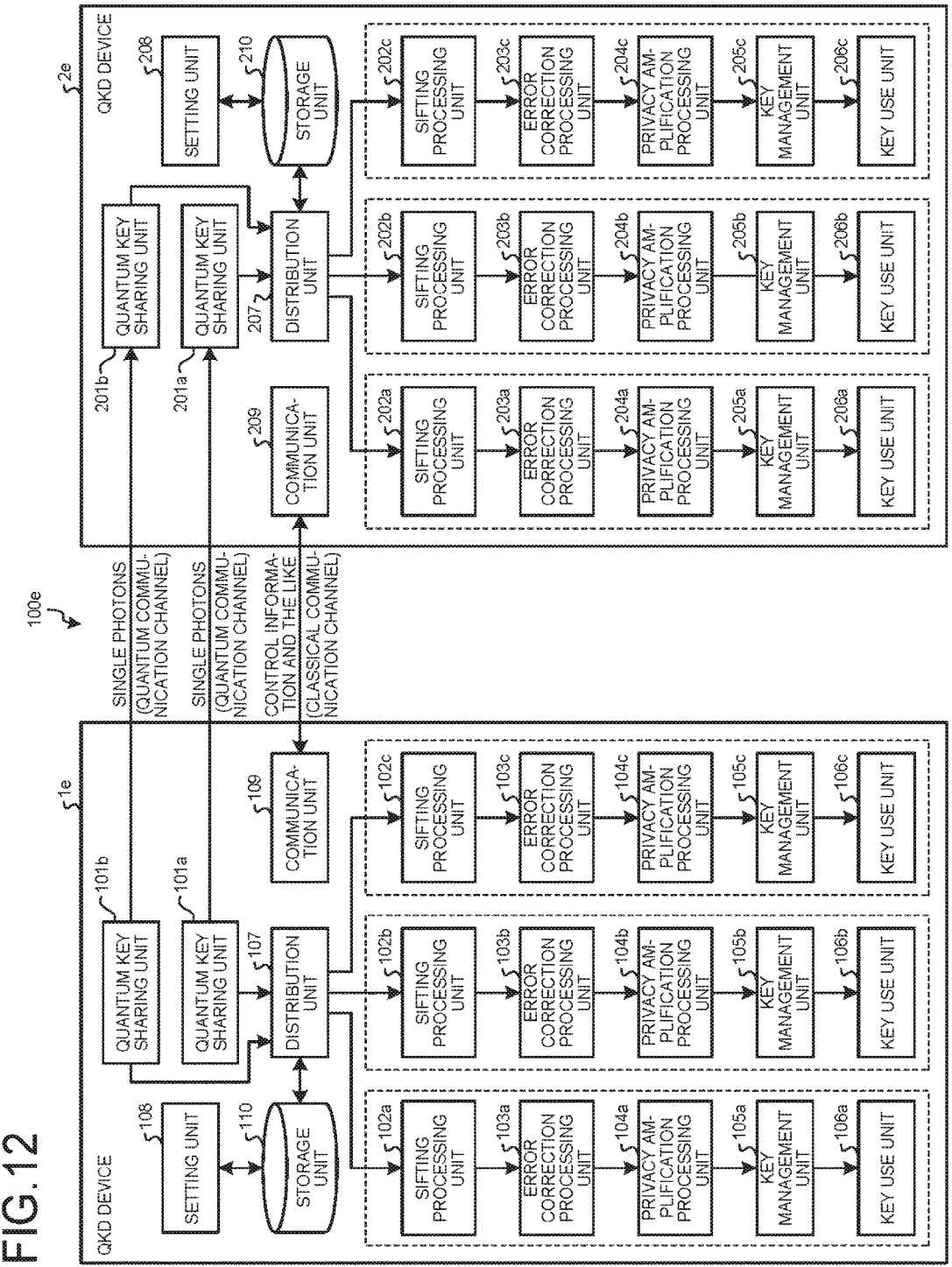
FIG. 12 is a diagram illustrating a functional block configuration of a QKD device according to a sixth embodiment.

FIG. 12 is a diagram illustrating an exemplary configuration of functional blocks of QKD devices according to the sixth embodiment. Referring to FIG. 12, the configuration of the functional blocks of the QKD devices (QKD devices 1e and 2e) of a quantum key distribution system 100e according to the sixth embodiment is now described. Note that a difference from the functional block configuration and encryption key sharing operation of the general QKD devices described above with reference to FIG. 3 and FIG. 4 is mainly described.

The example illustrated in FIG. 12 indicates a configuration in which the function of transmitting and detecting photons is enhanced in order to respond to request contents from a company for key generation speed, for example. Specifically, two physical quantum key sharing units (quantum key sharing unit 101a and 101b) are provided on the QKD device 1e side, and two physical quantum key sharing units (quantum key sharing units 201a and 201b) are provided on the QKD device 2e side. The other functional block configurations of the QKD devices 1e and 2e are the same as those of the QKD devices 1 and 2 according to the first embodiment illustrated in FIG. 6, respectively. In other words, the QKD devices 1e and 2e independently execute key distillation processing (sifting processing, error correction processing, and privacy amplification processing), key management, and key use in accordance with different parameters and different variations as virtual QKD devices A1 and A2, virtual QKD devices B1 and B2, and virtual QKD devices C1 and C2, which are virtualized in accordance with respective request contents from the companies A to C. Parameters and variations for the sifting processing, the error correction processing, the privacy amplification processing, the key management, and the key use are as described above with reference to FIG. 3. These parameters and variations are selected on the basis of respective request contents from operators of the virtual QKD devices A1 and A2, the virtual QKD devices B1 and B2, and the virtual QKD devices C1 and C2. The two quantum key sharing units of each of the QKD devices 1e and 2e are implemented by providing two optical processing devices 306 illustrated in FIG. 2.

By enhancing the physical hardware devices (quantum key sharing units 101a, 101b, 201a, and 201b) as illustrated in FIG. 12, the generation speed for transmitted photon information and detected photon information can be increased. Then, the distribution unit 107 distributes the increased transmitted photon information to the sifting processing units 102a to 102c, and the distribution unit 207 distributes the detected photon information to the sifting processing units 202a to 202c. In this manner, request contents from the companies A to C about the generation speed for the final encryption key (key generation speed) can be satisfied.

In the configuration illustrated in FIG. 12, the sifting processing and subsequent processing are virtualized similarly to the first embodiment, and hence even when the number of the physical quantum key sharing units (optical processing devices 306) serving as a source for generating transmitted photon information and detected photon information is increased (or decreased), the distribution unit 107 (207) can appropriately distribute the transmitted photon information and the detected photon information, thereby minimizing the influence on operation as virtual QKD devices.

Note that FIG. 12 conceptually illustrates the functions of the quantum key sharing units 101a and 101b, the sifting processing units 102a to 102c, the error correction processing units 103a to 103c, the privacy amplification processing units 104a to 104c, the key management units 105a to 105c, the key use units 106a to 106c, the distribution unit 107, the setting unit 108, the communication unit 109, and the storage unit 110, and embodiments are not limited to these configurations. For example, in the QKD device 1e illustrated in FIG. 12, the plurality of functional units illustrates as independent functional units may be configured as a single functional unit. Alternatively, in the QKD device 1e illustrated in FIG. 12, the function of a single functional unit may be divided into a plurality of functions to be configured as a plurality of functional units.

Furthermore, FIG. 12 conceptually illustrates the quantum key sharing units 201a and 201b, the sifting processing units 202a to 202c, the error correction processing units 203a to 203c, the privacy amplification processing units 204a to 204c, the key management units 205a to 205c, the key use units 206a to 206c, the distribution unit 207, the setting unit 208, the communication unit 209, and the storage unit 210, and embodiments are not limited to these configurations. For example, in the QKD device 2e illustrated in FIG. 12, a plurality of functional units illustrated as independent functional units may be configured as a single functional unit. Alternatively, in the QKD device 2e illustrated in FIG. 12, the function of a single functional unit may be divided into a plurality of functions to be configured as a plurality of functional units.

Furthermore, in the sixth embodiment, the "common processing unit" in the present invention corresponds to the quantum key sharing units 101a and 101b of the QKD device 1e, and the "individual processing unit" correspond to the sifting processing units 102a to 102c and the subsequent processing units. The same applies to the QKD device 2e.

As described above, by enhancing the physical hardware devices (in the above description, the quantum key sharing units), for example, even when the hardware of the physical QKD device is added or removed in order to deal with a failure in the physical QKD device or to enhance the physical QKD device, the influence on virtual. QKD devices can be limited to deterioration in key generation speed, thereby enabling the quantum key distribution system 100e to continuously operate. It should be understood that the quantum key distribution system 100e according to the sixth embodiment has the advantageous effects described above in the first embodiment.

Note that the configuration in which the physical hardware devices (in the example illustrated in FIG. 12, the quantum key sharing units 101a, 101b, 201a, and 201b) are enhanced as described above is applicable to each of the quantum key distribution systems according to the above-mentioned second to fifth embodiments.

Although the example illustrated in FIG. 12 indicates the configuration in which physical hardware devices are enhanced, countermeasures may be taken by adjusting the setting of current physical devices in order to satisfy request contents from companies (operators) about operation on virtual QKD devices. For example, countermeasures may be taken by adjusting the setting of physical devices so that all of virtual QKD devices can distribute transmitted photon information and detected photon information. For another example related to key generation speed, in the case where different key generation speeds are required from virtual QKD devices, countermeasures may be taken by adjusting the quantum key sharing unit (for example, adjusting laser drive speed) or adding dedicated processing hardware for implementing the operation of virtual QKD devices in order to implement photon transmission/reception processing with a total value of the key generation speeds or more. In this case, a part of the enhanced dedicated processing hardware may be used by only a part of the virtual QKD devices.

Note that a computer program to be executed by the QKD device according to each of the above-mentioned embodiments may be installed in, for example, a ROM 302 to be provided.

A computer program to be executed by the QKD device according to each of the above-mentioned embodiments may be recorded in a computer-readable recording medium, such as a compact disc read only memory (CD-ROM), a flexible disk (FD), a compact disc recordable (CD-R), and a digital versatile disc (DVD), as a file in an installable format or an executable format, and may be provided as a computer program product.

A computer program to be executed by the QKD device according to each of the above-mentioned embodiments may be stored on a computer connected to a network such as the Internet, and may be provided by being downloaded through the network. The computer program to be executed by the QKD device according to each of the above-mentioned embodiments may be provided or distributed through a network such as the Internet.

A computer program to be executed by the QKD device according to each of the above-mentioned embodiments can cause a computer to function as each of the above-mentioned functional units of the QKD device. The computer can execute the computer program by the CPU 301 reading the computer program from a computer-readable storage medium onto a main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A quantum key distribution device connectable to another quantum key distribution device through a quantum communication channel to share an encryption key, the quantum key distribution device comprising:
    a common processing unit configured to output intermediate data based on bit information obtained by transmitting or receiving a sequence of photons with the another quantum key distribution device through the quantum communication channel;
    two or more individual processing units, each individual processing unit generating or providing the encryption key in accordance with the intermediate data, the two or more individual processing units being set with mutually different parameters and variations; and
    a distribution unit configured to distribute the intermediate data that is output from the common processing unit to two or more distribution destinations that include the individual processing units, wherein
    the common processing unit comprises:
        a quantum key sharing unit configured to acquire a photon bit string corresponding to the sequence of photons transmitted or received through the quantum communication channel; and
        a first key distillation processing unit configured to output the intermediate data by executing partial processing of key distillation processing based on the photon bit string, and
    each of the individual processing units comprises a second key distillation processing unit configured to generate the encryption key by executing a remainder of the key distillation processing excluding the partial processing based on the intermediate data distributed from the distribution unit.

2. The quantum key distribution device according to claim 1, wherein the distribution unit equally distributes the intermediate data to the two or more individual processing units.

3. The quantum key distribution device according to claim 1, wherein the distribution unit determines a method of distributing the intermediate data to the two or more individual processing units in accordance with a respective request from each of the individual processing units.

4. The quantum key distribution device according to claim 1, wherein the distribution unit distributes the intermediate data to the second key distillation processing unit in accordance with a request that defines at least one of a bias of a basis, a proportion of a decoy pulse and a vacuum pulse, a dispersion of the decoy pulse, a dispersion of the vacuum pulse, and a dispersion of laser intensity.

5. The quantum key distribution device according to claim 1, wherein the distribution unit distributes the intermediate data to the individual processing unit in accordance with a request that defines generation speed for the intermediate data.

6. The quantum key distribution device according to claim 1, wherein
    the first key distillation processing unit is configured to calculate an estimated error rate on the intermediate data, and
    the distribution unit is configured to distribute the intermediate data to the second key distillation processing unit in accordance with a request that defines the estimated error rate corresponding to the intermediate data.

7. The quantum key distribution device according to claim 1, wherein
    the first key distillation processing unit is configured to acquire an error rate of the intermediate data through error correction processing among the key distillation processing on the intermediate data, and
    the distribution unit is configured to distribute the intermediate data to the second key distillation processing unit in accordance with a request that defines the error rate corresponding to the intermediate data.

8. The quantum key distribution device according to claim 1, wherein the common processing unit comprises two or more quantum key sharing units.

9. The quantum key distribution device according to claim 1, wherein the common processing unit comprises two or more quantum key sharing units.

10. A quantum key distribution system comprising a plurality of quantum key distribution devices connectable to each other through a quantum communication channel and configured to share an encryption key therebetween, wherein
    the plurality of quantum key distribution devices each comprise:
        a common processing unit configured to output intermediate data based on bit information obtained by transmitting or receiving a sequence of photons with another quantum key distribution device through the quantum communication channel;
        two or more individual processing units, each individual processing unit generating or providing the encryption key in accordance with the intermediate data, the two or more individual processing units being set with mutually different parameters and variations; and
        a distribution unit configured to distribute the intermediate data that is output from the common processing unit to two or more distribution destinations that include the individual processing units, wherein
    the common processing unit comprises:
        a quantum key sharing unit configured to acquire a photon bit string corresponding to the sequence of photons transmitted or received through the quantum communication channel; and
        a first key distillation processing unit configured to output the intermediate data by executing partial processing of key distillation processing based on the photon bit string, and
    each of the individual processing units comprises a second key distillation processing unit configured to generate the encryption key by executing a remainder of the key distillation processing excluding the partial processing based on the intermediate data distributed from the distribution unit.

11. A quantum key distribution method for a quantum key distribution system that comprises a plurality of quantum key distribution devices connectable to each other through a quantum communication channel to share an encryption key therebetween, the quantum key distribution method comprising:

outputting, by a common processing unit, intermediate data based on bit information obtained by transmitting or receiving a sequence of photons with another quantum key distribution device through the quantum communication channel;

generating or providing, by each of two or more individual processing units, the encryption key in accordance with the intermediate data; and distributing the intermediate data that is output to two or more destinations that include the individual processing units, wherein the common processing unit comprises:

a quantum key sharing unit configured to acquire a photon bit string corresponding to the sequence of photons transmitted or received through the quantum communication channel; and a first key distillation processing unit configured to output the intermediate data by executing partial processing of key distillation processing based on the photon bit string, and each of the individual processing units comprises a second key distillation processing unit configured to generate the encryption key by executing a remainder of the key distillation processing excluding the partial processing based on the intermediate data distributed.

\* \* \* \* \*